United States Patent
Detweiler et al.

(10) Patent No.: US 9,969,492 B2
(45) Date of Patent: May 15, 2018

(54) CROP HEIGHT ESTIMATION WITH UNMANNED AERIAL VEHICLES

(71) Applicant: NUtech Ventures, Lincoln, NE (US)

(72) Inventors: Carrick Detweiler, Lincoln, NE (US); David Anthony, Lincoln, NE (US); Sebastian Elbaum, Lincoln, NE (US)

(73) Assignee: NUTECH VENTURES, Lincoln, NE (US)

( * ) Notice: Subject to any disclaimer, the term of this patent is extended or adjusted under 35 U.S.C. 154(b) by 0 days. days.

(21) Appl. No.: 15/257,441

(22) Filed: Sep. 6, 2016

(65) Prior Publication Data
US 2017/0199528 A1 Jul. 13, 2017

Related U.S. Application Data

(60) Provisional application No. 62/214,881, filed on Sep. 4, 2015.

(51) Int. Cl.
*G05D 1/10* (2006.01)
*B64D 47/08* (2006.01)
(Continued)

(52) U.S. Cl.
CPC .......... *B64C 39/024* (2013.01); *G01S 7/4808* (2013.01); *G01S 17/42* (2013.01);
(Continued)

(58) Field of Classification Search
CPC .......... B64C 2201/12; B64C 2201/145; B64C 39/024; B64C 47/08; G01S 17/89; G05D 1/0088; G05D 1/0808; G05D 1/101
(Continued)

(56) References Cited

U.S. PATENT DOCUMENTS

| | | | |
|---|---|---|---|
| 6,792,684 B1 * | 9/2004 | Hyyppa | G01B 11/00 33/1 A |
| 7,474,964 B1 * | 1/2009 | Welty | A01G 23/00 702/2 |

(Continued)

OTHER PUBLICATIONS

Uto et al., "Characterization of Rice Paddies by a UAV-Mounted Miniature Hyperspectral Sensor System," IEEE Journal of Selected Topics in Applied Earth Observations and Remote Sensing, vol. 6, No. 2, pp. 851-860 (Apr. 2013).

(Continued)

*Primary Examiner* — Tyler J Lee
(74) *Attorney, Agent, or Firm* — Jenkins, Wilson, Taylor & Hunt, P.A.

(57) ABSTRACT

An unmanned aerial vehicle (UAV) can be configured for crop height estimation. In some examples, the UAV includes an aerial propulsion system, a laser scanner configured to face downwards while the UAV is in flight, and a control system. The laser scanner is configured to scan through a two-dimensional scan angle and is characterized by a maximum range. The control system causes the UAV to fly over an agricultural field and maintain, using the aerial propulsion system and the laser scanner, a distance between the UAV and a top of crops in the agricultural field to within a programmed range of distances based on the maximum range of the laser scanner. The control system determines, using range data from the laser scanner, a crop height from the top of the crops to the ground.

22 Claims, 19 Drawing Sheets

(51) Int. Cl.
*G05D 1/08* (2006.01)
*B64C 39/02* (2006.01)
*G01S 17/89* (2006.01)
*G05D 1/00* (2006.01)
*G01S 17/42* (2006.01)
*G01S 17/88* (2006.01)
*G01S 7/48* (2006.01)
*G05D 1/06* (2006.01)

(52) U.S. Cl.
CPC .............. *G01S 17/88* (2013.01); *G01S 17/89* (2013.01); *G05D 1/0646* (2013.01); *B64C 2201/027* (2013.01); *B64C 2201/12* (2013.01); *B64C 2201/123* (2013.01); *B64C 2201/145* (2013.01)

(58) Field of Classification Search
USPC ........................................ 701/3–11
See application file for complete search history.

(56) References Cited

U.S. PATENT DOCUMENTS

| | | | | |
|---|---|---|---|---|
| 7,720,605 | B2* | 5/2010 | Welty | A01G 23/00 |
| | | | | 702/2 |
| 8,208,689 | B2* | 6/2012 | Savolainen | G01C 11/025 |
| | | | | 382/110 |
| 8,275,547 | B2* | 9/2012 | Rousselle | G06Q 10/10 |
| | | | | 33/228 |
| 8,680,994 | B2* | 3/2014 | Leppanen | G06K 9/00657 |
| | | | | 340/2.81 |
| 8,897,483 | B2* | 11/2014 | Ram | G06Q 10/087 |
| | | | | 382/100 |
| 9,063,544 | B2* | 6/2015 | Vian | G05D 1/0094 |
| 9,117,185 | B2* | 8/2015 | Vian | G06Q 10/06 |
| 9,198,363 | B2* | 12/2015 | Vian | A01G 23/00 |
| 9,251,698 | B2* | 2/2016 | Vian | H04Q 9/00 |
| 9,482,524 | B2* | 11/2016 | Metzler | G01B 21/04 |
| 2008/0260237 | A1* | 10/2008 | Savolainen | G06K 9/0063 |
| | | | | 382/154 |
| 2013/0325346 | A1* | 12/2013 | McPeek | G01N 33/0098 |
| | | | | 702/2 |
| 2015/0131079 | A1* | 5/2015 | Heinonen | G01S 17/08 |
| | | | | 356/4.01 |
| 2015/0228031 | A1* | 8/2015 | Emison | G06F 17/30076 |
| | | | | 705/4 |
| 2016/0247115 | A1* | 8/2016 | Pons | G06Q 10/087 |

OTHER PUBLICATIONS

Costa et al., "The Use of Unmanned Aerial Vehicles and Wireless Sensor Network in Agricultural Applications," IEEE International and Remote Sensing Symposium, pp. 1-4 (2012).

Biasio et al., "UAV based Multi-spectral Imaging System for Environmental Monitoring," Beitrage, Technisches Messen, 78, DOI 10.1524/teme.2011.0204, pp. 503-507 (Aug. 2011).

Edson et al., "Airborne Light Detection and Ranging (LiDAR) for Individual Tree Stem Location, Height, and Biomass Measurements," Remote Sens., 3, doi:10.3390/rs3112494, pp. 2494-2528 (2011).

Kazmi et al., "Adaptive Surveying and Early Treatment of Crops with a Team of Autonomous Vehicles," Proceedings of the 5th European Conference on Mobile Robots ECMR 2011, pp. 1-6 (2011).

Listopad et al., "Portable and Airborne Small Footprint LiDAR: Forest Canopy Structure Estimation of Fire Managed Plots," Remote Sens., 3, doi:10.3390/rs3071284, pp. 1284-1307 (2011).

* cited by examiner

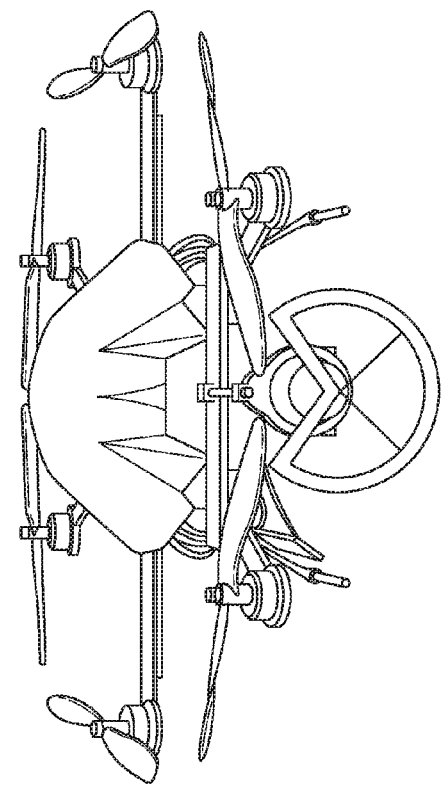
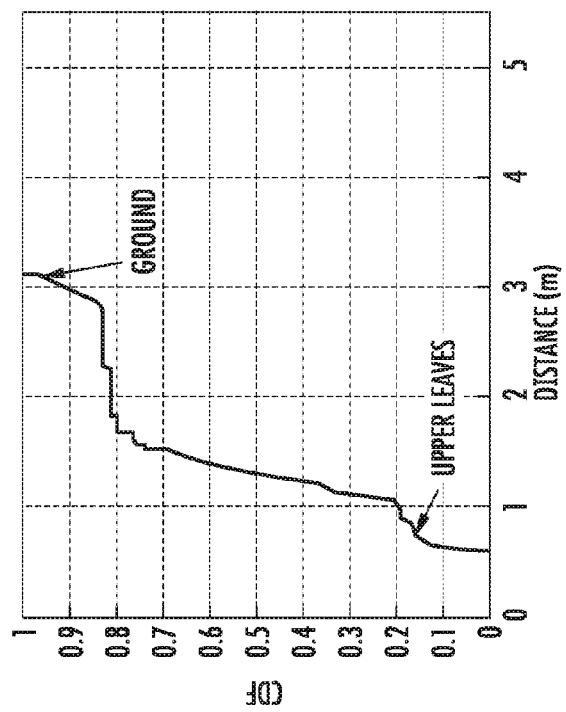
FIG. 3C
FIG. 3D

CROP HEIGHT ESTIMATION WITH UNMANNED AERIAL VEHICLES

PRIORITY CLAIM

This application claims the benefit of U.S. Provisional Application Ser. No. 62/214,881, filed Sep. 4, 2015, the disclosure of which is incorporated herein by reference in its entirety.

GOVERNMENT INTEREST

This invention was made with government support under grant number 2013-67021-20947 awarded by the United States Department of Agriculture and grant number CNS1217400 awarded by the National Science Foundation. The government has certain rights to this invention.

BACKGROUND

The subject matter described in this specifically relates generally to unmanned aerial vehicles (UAVs), e.g., UAVs configured to determine crop height and to follow rows.

The use of UAVs in agriculture is an active research topic. Existing work mostly utilizes UAVs to deliver aerial imagery of fields in a more timely and lower cost manner than traditional methods, such as manned aircraft and satellite imagery. Using a large UAV, it is possible to classify different vegetation in a field. Differentiating between vegetation types is used for weed management practices and coordinating ground robots. Small rotorcrafts operating at altitudes of 200 m above the ground and speeds of 30 km/h are capable of surveying up to 70 ha/hr. A smaller UAV operating at ranges of 10 m above the ground is capable of surveying rice paddies with a multi-spectral camera. By operating close to the crops, the impact of atmospheric distortion is reduced, but fast and accurate altitude and position measurements are needed.

In forestry applications there has been a significant amount of research using 3D LiDARs to measure canopy cover, biomass, and tree heights. Tree heights have been assessed using man-portable LiDAR systems, collecting data similar to what we desire to collect for corn crops. This system is cumbersome as it requires scientists to reposition the system at all data collection points.

LiDARs have been used in conjunction with aerial platforms for forestry experiments as well. LiDARs generally require larger platforms that are difficult and risky to operate close to crops, which means they are forced to fly at high altitudes where the irregularity of the tree shapes makes feature extraction difficult. These conditions also push LiDARs outside their recommended operating specifications. UAVs can mitigate these problems by flying at altitudes between 10-40 m, which produces information with a higher spatial density. At these altitudes, a heavy and expensive LiDAR is needed to achieve a high spatial information density.

Simultaneous localization and mapping (SLAM) algorithms have been an area of intense research. SLAM algorithms using only a laser scanner in an urban environment are accurate for ground vehicle navigation. Outdoor SLAM has been accomplished using a combination of vision and laser ranging data, which can increase the accuracy, at the cost of computational complexity. Actuated planar laser scanners have been shown to work in unstructured environments such as forests, but require extremely intensive computation, and are not suitable for real time navigation for aerial robots requiring precise height control.

Localizing robots in forestry and agricultural settings is an active area of research. Cameras are a popular option for guiding ground vehicles through row crops. Finding distinguishable textures and features in outdoor scenes have lead to viable localization algorithms, but in a fully grown agricultural field, the crops have very little visual contrast. In crops where the ground is exposed between rows, a ground based robot can use a camera to look down the rows and use the parallel row features to guide the robot. This approach is not practical in crops such as corn and soybeans, where the crops form a full canopy over the rows and visually obscure the parallel features. Also, a robot flying overhead may not have the correct perspective to make this type of approach work.

LiDARs frequently supplement or replace cameras for vehicle localization because of their high accuracy and ability to operate in variable and low light conditions. Hough transforms have been used to extract tree trunks from ground based vehicle LiDAR scans. Similarly, circular tree trunks have been extracted from LiDAR scans for forested environments. It may be possible for ground based vehicles to use similar approaches in corn fields, however the vehicle would damage crops. A UAV cannot use these approaches because the corn stalks are not well defined when view from above. Robots have been able to navigate through cluttered orchard environments with an a priori map and reflective tape, but this approach is not usable in large agricultural fields where the tape could only be placed at the perimeter of the field.

SUMMARY

Remote sensing by Unmanned Aerial Vehicles (UAVs) is changing the way agriculture operates by increasing the spatial-temporal resolution of data collection. Micro-UAVs have the potential to further improve and enrich the data collected by operating close to the crops, enabling the collection of higher spatio-temporal resolution data. This specification describes a UAV-mounted measurement system that utilizes a laser scanner to compute crop heights, a critical indicator of crop health, and also the position of the UAV relative to the rows of the crops in the field, e.g., at better than GPS accuracy. The system filters, transforms, and analyzes the cluttered range data in real-time to determine the distance to the ground and to the top of the crops.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIGS. 3A-D illustrate an example of the UAV attempting to sense the ground using multiple sensor readings;

DETAILED DESCRIPTION

UAVs are improving modern agriculture production and research by providing data at higher temporal and spatial resolution scales, and lower cost, than traditional collection methods, such as manned aircraft and satellites. Micro-UAVs offer further potential benefits as they lower costs and operator risks, accelerate deployment times, and are able to operate closer to crops to increase spatial resolution. Operating close to the crops also allow UAVs to utilize new sensors, such as low power, passive devices, that are not effective with high flying aircraft.

Figure 1:
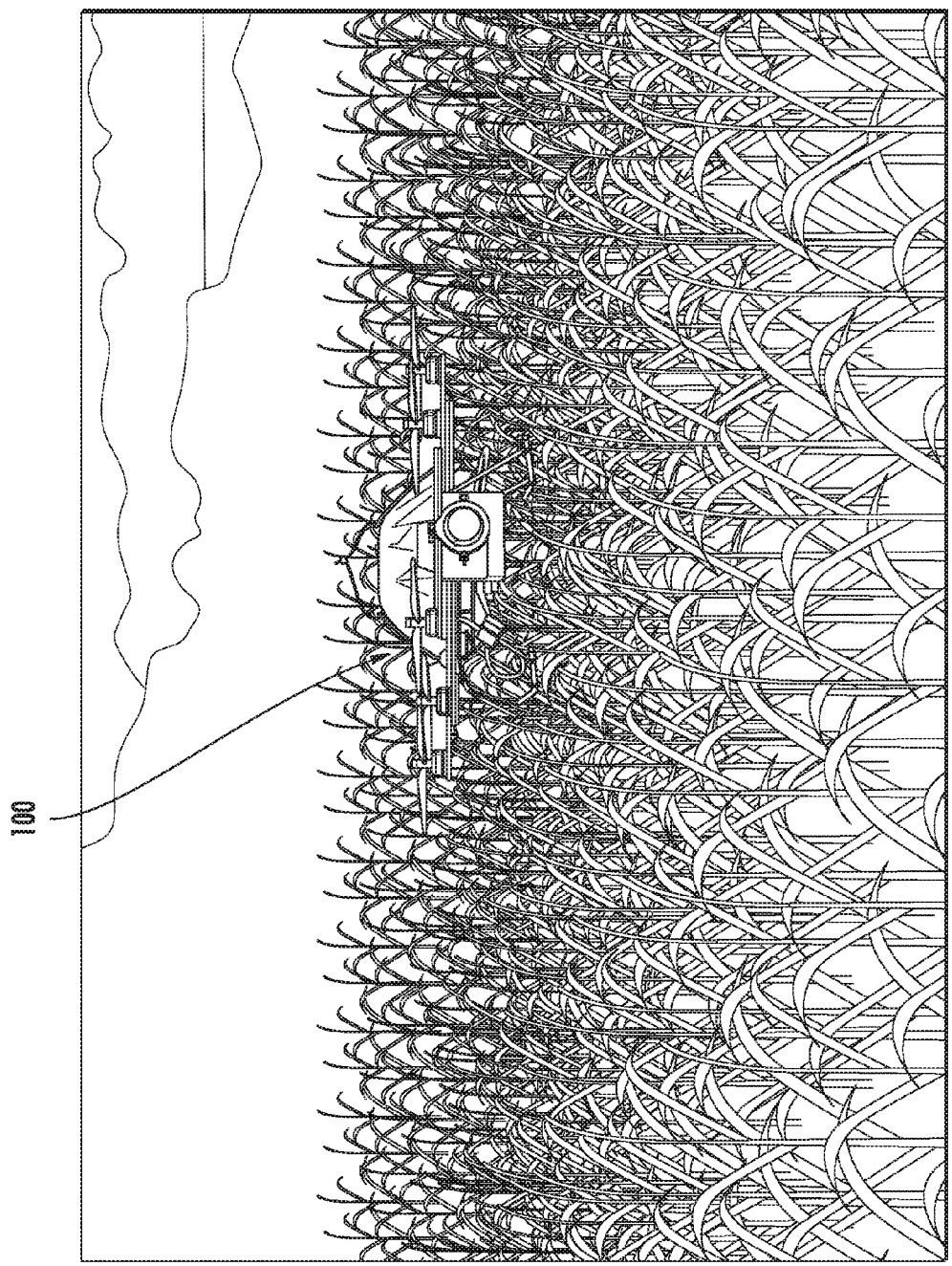
FIG. 1 shows an example UAV configured to measure crop height.

FIG. 1 shows an example UAV 100 configured to measure crop height and to follow rows, e.g., without relying on GPS. The crop height measurement system is based on a micro-UAV platform.

Obtaining accurate and timely crop height estimates is important to characterize plants' growth rate and health. Agricultural researchers use this data to measure the impact of genetic variation in the crops on drought resistance and responses to environmental stresses. Practitioners may also use crop height information to assess crop development and plan treatments. These measurements are currently obtained through manual measurement, or by driving heavy equipment through the field. These collection methods are time consuming and damaging to the crops, and as such, are not regularly used.

Measuring crops requires height estimates of the tops of the crop and the ground, the difference of which is the crop height. In addition, the precise location in the field (e.g., which plant and row) can be determined. Measuring crops from the air to characterize the top of the canopy benefits from unobstructed movement that does not damage the crops, but locating the ground is more challenging as layers of plants' leaves can obscure the ground. There are two ways to overcome this challenge. One way is to increase sensing power by using, for example, radars or powerful LiDARs. An alternative approach is to fly a micro-UAV equipped with less powerful sensors but operating closer to the crops to exploit small gaps in the crop canopy to directly sense the ground, the lower levels of the vegetation, and use this to also follow the rows of the crops.

The autonomous crop height measurement system described in this specification can be configured for computing corn crop height within 5 cm of manual measurements, while increasing the areas and frequency of measures by two orders of magnitude. In addition, it can follow the rows the crops are planted in, enabling precise georeferencing of the data with better than standard GPS accuracy. The system utilizes low-cost sensors and a UAV platform to reduce costs and operator risks, increase operating ease, and be highly portable. The system can be implemented using a commercial micro-UAV, laser scanner, barometer, IMU, and a GPS receiver to effectively operate the UAV over crops, estimate the UAV altitude, and accurately measure the crop's height by applying a series of onboard filters and transformations. By operating at a low altitude, the system greatly increases the spatial resolution of the collected data, when compared to traditional approaches. Furthermore, the small size and weight of the system limits the risks of operating the unit. The system leverages a downward mounted laser scanner to help maintain the UAV close to the crops and to characterize the crops profile. This profile is then processed through a series of transformations and filters to compute the UAV's altitude and the crop's height.

Surveying agricultural fields requires an understanding of the underlying vegetation. For example, a typical mature corn plant has 12-22 leaves arranged along the stalk that grows to a height of 2-3 m. The point at which a leaf joins the stalk is referred to as a 'node.' As the plant matures, a thin, long, tassel emerges from the top of the plant.

The structure of a corn plant makes it challenging to survey fields, not only from the air, but also manually from the ground. The corn is typically planted in rows that are spaced 30 or 36 inches (76.2/91.44 cm) apart. As the corn grows, the leaves form a dense canopy between the rows, which limits an aerial vehicle's view of the ground. Typically, the height of the plant is defined as the distance from the top node to the ground.

Figure 2:
FIG. 2 shows the standard method of manually measuring the height of corn in a field.

FIG. 2 shows the standard method of manually measuring the height of corn in a field. This hand measurement process is labor intensive and error prone. Tractors with specialized measuring devices can measure the crops in a field, but will damage both the plants and the ground. Thus, it is only infrequently performed on a small subset of plants in a field, despite the large impact such measurements could have on crop production.

Estimating crop height with an accuracy of 5 cm requires estimates of similar accuracy for the location of the ground and the plants' tops to compute their differential.

Determining the ground and crop top location, however, can be challenging. The foliage of the corn fields makes it difficult to directly sense the true ground location.

Figure 3B:
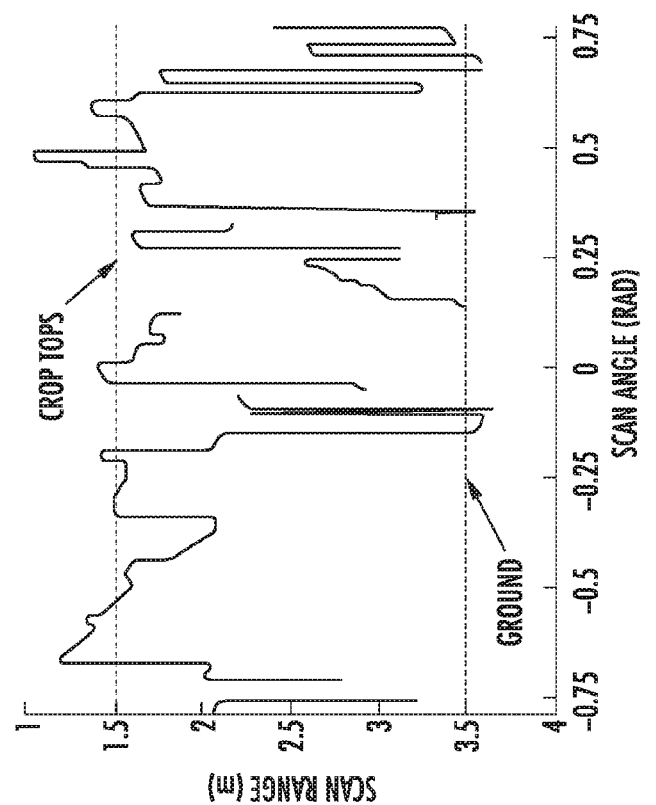
Figure 3A:
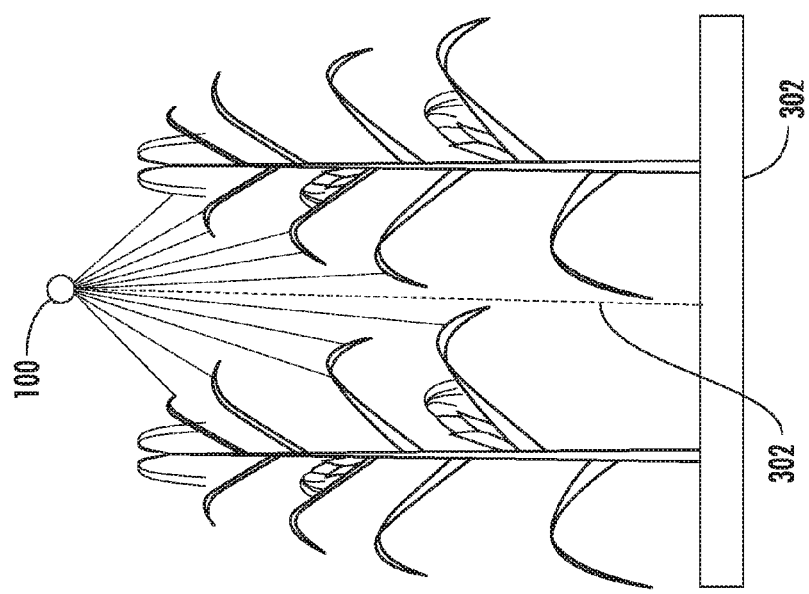

FIG. 3A illustrates an example of the UAV 100 attempting to sense the ground using multiple sensor readings, represented by the dashed lines. The layers of leaves block most of the sensor measurements, represented by the dotted lines. Only one sensor measurement, shown in the dashed line 302, finds a narrow gap in the foliage to reach the ground. Similarly, without enough readings the top of the crop may be missed. From these readings, statistics such as the crop height can be computed, and by georeferencing the scans with GPS, height maps of the field can be constructed.

In practice, the measurements also include noise. FIG. 3B shows an example of a single laser scan obtained at a corn field. The x-axis represents the sample angle in reference to the UAV's body. The y-axis represents the distance from the scanner to a surface. As illustrated, there is some height variation across the top of the plants, at some angles the values are invalid (not plotted), and the corn leaves block most of the scans at the upper layers of leaves. However, the single scan reveals that some readings have reached the ground which in the figure is consistently located at 3.5 m from the UAV. More scans and readings per scan increase the probability of sensing through the canopy and better characterizing the crop's top.

FIG. 3C shows an example cumulative distributed function (CDF) of the scan in FIG. 3B. The distribution in FIG. 3C makes it easier to identify the different elements of the crop. The upper layer of leaves is represented by the sudden jump at the 0.5 m mark in the CDF. The multiple layers of leaves then smooths the distribution until the 1.75 m mark. At this point, the plants are largely leaf free, so most scans then reach the ground at around the 3.5 m mark. This profile of CDF is characteristic of the crop scans obtained from the micro-UAV operating close to corn crops, and it hints at the potential of extracting plants' tops and ground estimates from it.

The scans can be represented as a multinomial distribution. The ranges reported by the sensor are discretized into a set of k ranges, $h_k$. The leaves' density determines the probability $p_k$ of the sensor detecting one of the leaves at a given area, so that the probability distribution is meaningful. Second, it must have a narrow sensing radius, so that the measurements can pass through the small gaps in the leaves, and thus sense the ground.

Referring back to FIG. 1, the example UAV 100 can be based on an Ascending Technologies Firefly hexacopter which has a maximum payload of 600 g, of which we use 528 g. We augmented the UAV with a Hokuyo URG-04LX-UG01 laser scanner, which is mounted in a downward facing configuration under the UAV. The laser scanner produces a 240° scan at 10 Hz, with an angular resolution of ≈0.36°, which creates 683 range readings per scan. The scanner has a maximum range of 5.6 m. The scanner has an integrated filter which indicates which ranges are invalid. In some examples, the scanner is designed for indoor sensing, but when it is mounted in a downward facing configuration without a direct view of the sun, it will function effectively in an outdoor environment. An onboard Atomboard processor interfaces to and processes data from the laser scanner. The onboard GPS and IMU are used in conjunction with the laser scanner to control the UAV height. The software on the Atomboard can be developed in ROS. The system can be configured by assuming that the crops are no more than three meters tall. By flying the UAV within one meter of the plants' tops, the spatial resolution of the laser scans enables stable height control and accurate estimates of crop height.

Converting the laser scan information into a crop height and UAV altitude estimate is a multi-step procedure, as outlined in Algorithm 1.

---

Algorithm 1

```
 1: estimated_crop_height ← 0
 2: num_scans ← 0
 3: procedure ESTIMATECROPHEIGHT(p_g, p_c)
 4:     while PendingWaypoints do
 5:         [L] ← Scanner( )                                             ▷ Get data from scanner
 6:         (r, p, y) ← IMU( )                                           ▷ Get data from IMU
 7:         b ← Barometer( )                                             ▷ Get barometric altitude estimate
 8:         (altitude, scan_crop_height) ← ProcessScan([L], r, p, y, b, p_g, p_c)
 9:         UAVControl(altitude)                                         ▷ Contol the UAV altitude
10:         estimated_crop_height ← estimated_crop_height + scan_crop_height
11:         num_scans ← num_scans + 1
12:     end while
13:     return estimated_crop_height/num_scans                           ▷ Return the estimate crop height for the field
14: end procedure
15:
16: procedure PROCESSSCAN([L], r, p, y, barometer, p_g, p_c)             ▷ Crop and UAV Height Estimation from laser scans [L].
17:                                      ▷ the roll, pitch, and yaw of the UAV, the barometric pressure derived UAV height estimate.
18:                                      ▷ and the parameters for estimate the location of the ground and the top of the crop
19:     F ← ConeFilter([L])                                              ▷ Only keep center 90° of scans
20:     Z ← F * EulerRotation(r,p,y)                                     ▷ Transform from UAV frame to world frame
21:     P ← Percentile(Z)                                                ▷ Assign a percentile rank p ∈ P to every range z ∈ Z
22:     (g,h) ← Estimator(P,Z,p_g,p_c)                                   ▷ Ground and top of crop corresponds to specific percentiles in Z
23:     filtered_g ← MedianFilter(g)                                     ▷ Pass ground estimate through median filter, length w
24:     filtered_h ← MedianFilter(h)                                     ▷ Pass crop top estimate through median filter, length w
25:     scan_crop_height ← filtered_g − filtered_h                       ▷ Estimate the height of the crop in the scan
26:     altitude = Kalman(filtered_h, barometer)                         ▷ Estimate UAV's height based on barometer and laser
27:     return (altitude, scan_crop_height)                              ▷ Return the two values estimated by the procedure
28: end procedure
```

--- height k. The number of readings reported in each location is the set of n trials for the multinomial distribution. We seek to find two percentiles, $p_g$ and $p_c$, which can be used to estimate the ground and crop top location from the distribution of the laser scans.

Characterizing the plants in this way can place certain requirements on the sensor being used to gather the readings. First, it must be able to quickly collect many samples from The measurements from the laser scanner are converted to altitude estimates, filtered, and transformed to extract estimates of the crop height and UAV altitude. Algorithm 1 presents the high level algorithm for this procedure. Procedure EstimateCropHeight collects sensor readings from the onboard sensors and uses the measurements to process each laser scan, using Procedure ProcessScan. ProcessScan returns an estimate of the UAV altitude and the height of the crop in the scan. EstimateCropHeight uses the two estimates to control the UAV, and estimate the height of the crops in the area of interest. The next few paragraphs the operation of ProcessScan in detail.

Cone Filter:

The ConeFilter procedure on line 19 of Algorithm 1 decimates each laser scan reading, leaving a 90° arc of samples that are within 45° of the z-axis of the UAV. The full 240° scan range is shown as a wider arc in FIG. 3D, and the used samples are from the region shown in narrower arc. Rejecting all of the scan information from outside this region eliminates the readings from the UAV's body, samples where the ground is outside the maximum range of the scanner, and other readings that do not sense the crop. Since the UAV does not aggressively maneuver during a surveying mission, filtering early significantly cuts the computational burden of later stages without losing useful information.

The cone filter, combined with the maximum range of the laser scanner, can produce an upper limit to the UAV's altitude. Given the difficulties in sensing the ground, all of the scans in the 90° should be configured to have a chance of reaching the ground, in order to maximize the probability of detecting the ground. Since the laser scanner has a maximum range of 5.6 m, this restricts the UAV to an altitude of 5.6*cos(45°)=4.0 m.

Frame Transformation:

Next, the remaining range data is transformed from the body frame of the UAV, to the world frame. On line 20 of Algorithm 1, roll, pitch, and yaw data from the onboard IMU is used in an Euler rotation matrix to extract the z-components of the range data in the global frame, and to compensate for the pitch and roll of the UAV.

Percentile Computation & Range Estimation:

The percentile rank of each z-component is then computed (line 21 of Algorithm 1). Assuming that the ground and top of the crop will be parameterized at a certain percentile of the data, the percentile ranks are used to estimate where the ground and crop is in each scan. On line 22, the Estimator procedure uses the percentile ranks and z-components to extract estimates of the UAV height and distance to the crops for each scan. The Estimator procedure searches through the percentile ranks, P, to find the closest percentiles to the ground and crop top estimates, $p_g$ and $p_c$. The distances in Z that correspond to these percentiles are then returned as the ground and crop top distance estimates.

$p_g$ and $p_c$ are user defined parameters that can be experimentally derived. Pairs of these parameters can be found that enable accurate altitude and crop height estimates.

Median Filtering:

The crop top and ground range estimates are noisy, and tend to have outliers. The outliers are caused by infrequent scans where no range measurements reached the ground, abnormal plant growths, and occasional debris in the field. Each estimate of the ground and crop top is passed through a median filter, of length w, on lines 23 and 24 of Algorithm 1. The filter length can be empirically determined. If it is set to a shorter length, the system is vulnerable to outliers. A longer filter length rejects more outliers, however, filter length introduces time lag in the control system, and the UAV becomes less responsive to altitude changes.

Flight Control:

The filtered estimate of the ground distance is used in the flight control software. The laser scanner derived height estimate is combined with the barometric pressure height estimate, using a Kalman filter (line 26 of Alg. 1). The Kalman filter produces the final height estimate that is used by a PID control system to guide the UAV.

Crop Height Estimate:

The crop height estimate for each scan is estimated by taking the difference between the estimated distance to the top of the crop, and the filtered distance to the ground. The crop height estimates for an area of interest are accumulated during the flight, and by averaging the crop height estimate from several of these scans, the crop height in an area can be estimated.

The system can be tested using an indoor and/or an outdoor testbed. FIG. 4A illustrates an example indoor testbed. The testbed contains artificial plants with multiple levels of long, narrow leaves to simulate corn plants. The plants are placed in 12 different configurations of rows spaced 0.5 m apart. The configurations differ in the plant arrangements to ensure the results are not dependent on a particular ordering of plants. There are also two kinds of configurations of different density. In configurations 1-10 the plants are spaced between 40 and 50 cm apart. Configurations 11-12 are denser, with plants placed 20 cm apart within a row, and are meant to assess the system's ability to operate over extremely dense foliage, where fewer laser measurements reach the ground. The artificial plants have a mean height of 0.967 m and a standard deviation of 3.74 cm.

A Vicon motion capture system can be used to provide ground truth estimates of the true UAV height.

The $95^{th}$ percentile of the longest range reported by its scanner ($p_g$ in Algorithm 1) can be selected, with a median filter of length 3 (w in Algorithm 1) applied to the altitude estimate to reduce noise. These values can be empirically determined, e.g., from experimentation. The UAV maintains a stable altitude with the filter length, and quickly reacts to any perturbations.

Figure 4B:
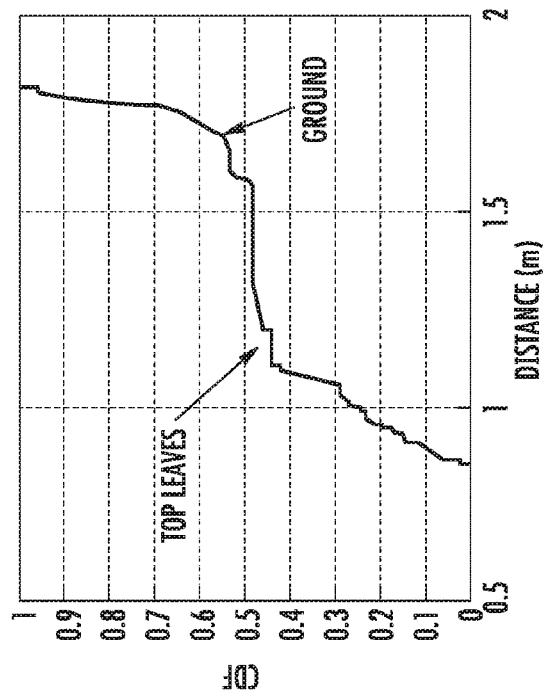
FIGS. 4A-D illustrate an example indoor testbed.
Figure 4A:
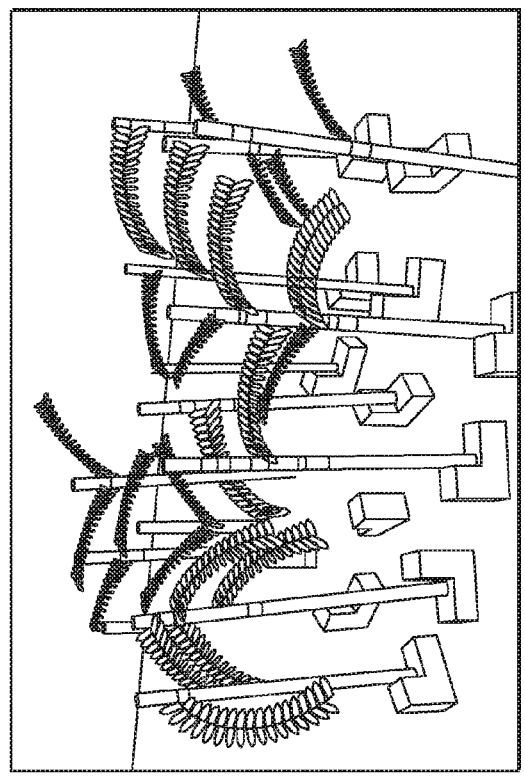

FIG. 4B is a chart illustrating example scan data from an indoor testbed. FIG. 4B demonstrates that the system should not be sensitive to the exact choice of $p_g$.

Figure 4D:
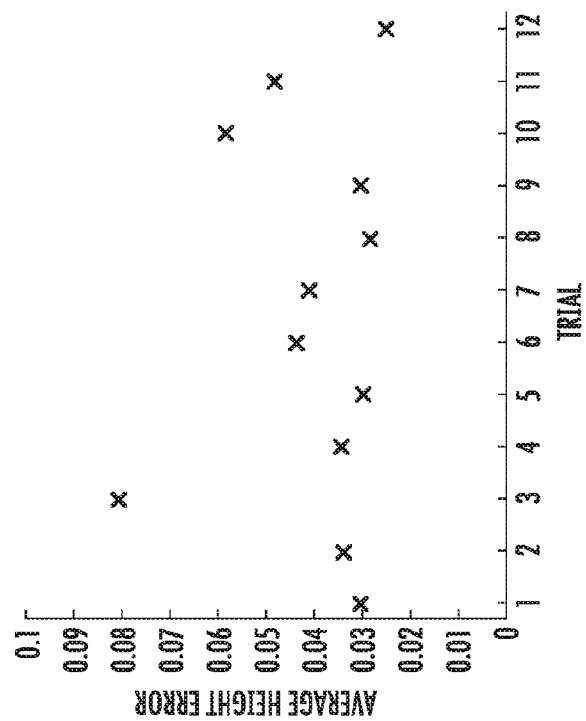
Figure 4C:
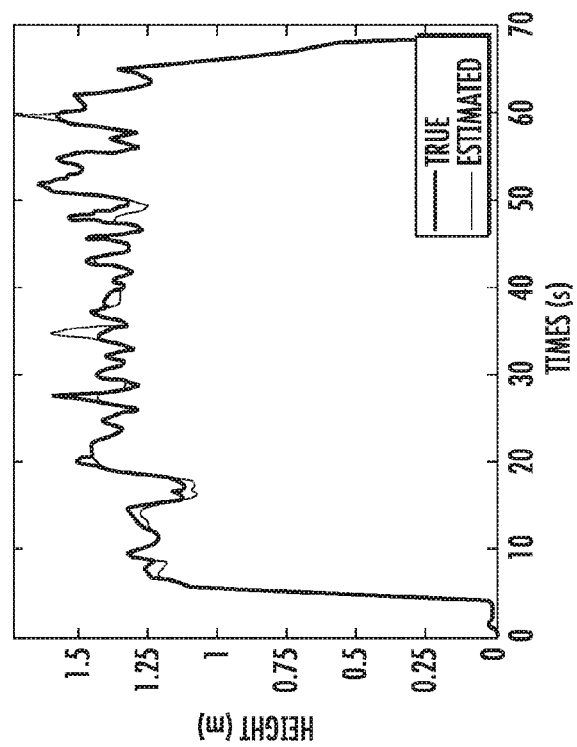

FIG. 4C shows the ground truth altitude of the UAV versus the pose calculated using the system estimate for an example trial. The estimated altitude follows the true height extremely closely, and the UAV transitioned between the areas covered by the plants, and bare floor with few significant changes in altitude estimates. There are four instances where the altitude estimate has a minor divergence from the ground truth estimate, but the system quickly recovers. Increasing the filter length w would mitigate these problems, but could make the system less responsive to true changes in height, and thus more difficult to control.

FIG. 4D shows the average difference between the true height and the system estimated altitude for all twelve configurations. The system has an average error of 4.1 cm for the first ten sparse configurations, and an error of 3.6 cm for the final two dense configurations. The variance for all configurations was 0.0003. This small error confirms that the system is consistently tracking the true ground, and the choice of $p_g$ is valid.

An outdoor testbed can be used to assess the system's ability to measure a real crop, and to test the laser scanner's effectiveness outdoor. In some examples, the laser scanner may not function when placed with a direct view of the sun. However, by mounting the scanner in a downward facing configuration, the 96.5% of the range measurements in each scan may be valid.

To create the ground truth estimate for the outdoor testbed, a trained researcher measured the height of 20 plants. The height of the corn from the ground to the top of the corn varies between 1.98 m and 2.26 m, with a mean height of 2.108 m and a standard deviation of 8.28 cm. The height from the ground to the tassel of the same plants ranged between 2.33 and 2.65 m, with a mean of 2.51 m and a standard deviation of 8.61 cm. A 3×10 m area was surveyed, which is the size of a typical agronomy phenotyping trial.

To evaluate the system in an outdoor setting, a total of 1,155 scans were taken above the corn field in a sunny morning in August. The UAV was flown under manual control multiple times over each row in the area, at approximately the same speed. The laser scanner continuously scans the region, and the results from the scans are combined to form an estimate of the average height of the corn in the region. After restricting the sample angles to the central 90° arc, 295,680 individual range readings were collected. Of these samples, over 96.5% are valid.

Figure 5:
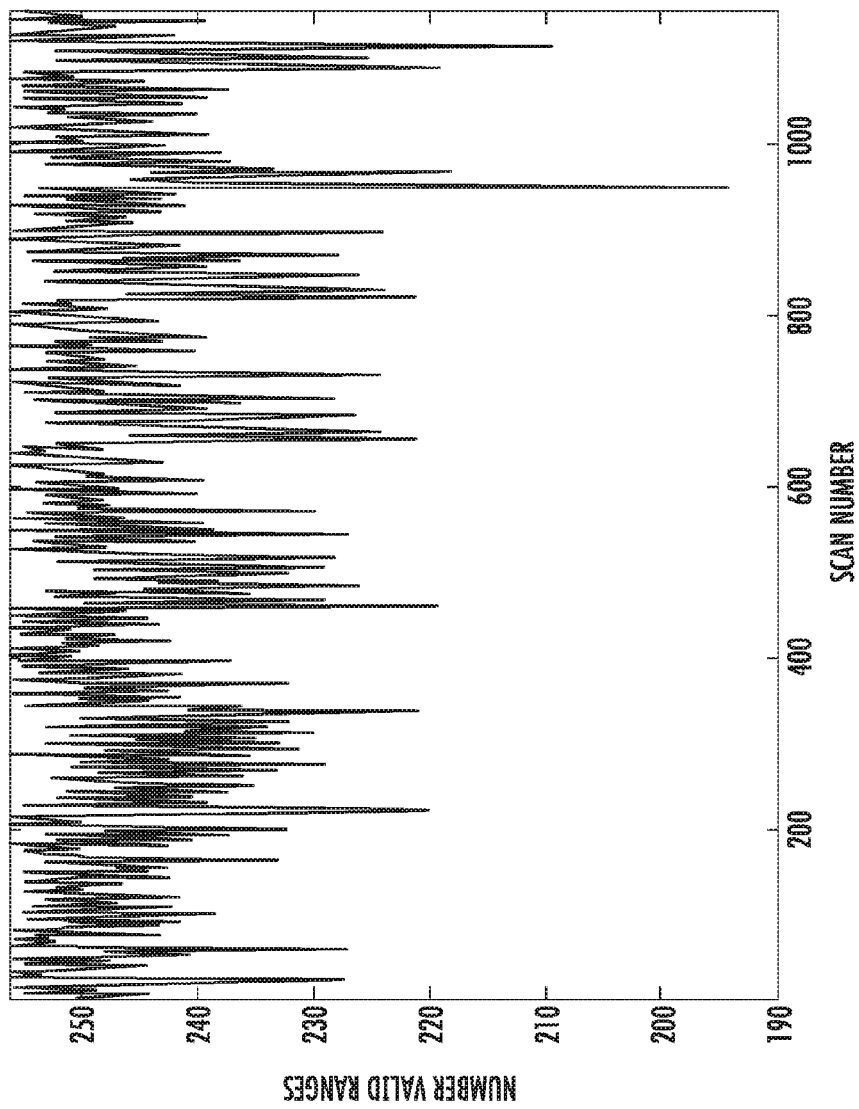
FIG. 5 is a chart illustrating valid samples per scan as reported by the laser scanner's internal filtering process.

FIG. 5 is a chart illustrating valid samples per scan as reported by the laser scanner's internal filtering process. At least 75% of the possible 256 range readings in the 90° arc are valid in each scan. Even when the number of valid samples drops, it quickly recovers, so the UAV did not encounter prolonged periods of bad scanner performance. The large number of range readings in each scan enables the construction of a well defined distribution, and potentially allows many samples to reach the ground in each scan. The number of valid samples in each scan shows that the small laser scanner, when properly placed, is effective in an outdoor setting.

To evaluate the system, the example distributions from the indoor test can be compared with the example distributions from the outdoor test. FIG. 4B shows the CDF of a scan taken in the indoor testbed. This figure shows the same sharp increase in readings, corresponding to the tops of the leaves, at a range of 0.9 m to 1.1 m, as the outdoor corn does. The layers of leaves cause the same gradual increase in the CDF, until the last layer is reached, as is seen in FIG. 3C. Finally, the samples that reach the ground cause a final sharp uptick in the CDF at long ranges, just as in the outdoor data. The similar shape of the two distributions suggests that the same crop height and altitude estimates can be used in both cases, even though the indoor testbed uses much shorter plants.

The input parameters $p_g$ and $p_c$ can affect the estimates of the crop height. Those parameters are used to choose which samples represent the ground and the top of the crop.

TABLE 1

| $p_g$ | $p_c$ | Est. Indoor Height (m) | Est. Outdoor Height (m) | Indoor Error (m) | Outdoor Error (m) |
|---|---|---|---|---|---|
| 100 | 0 | 1.0545 | 2.8810 | 0.0875 | 0.7730 |
| 99 | 1 | 1.0412 | 2.5026 | 0.0742 | 0.3946 |
| 99 | 2 | 1.0335 | 2.4601 | 0.0665 | 0.3521 |
| 99 | 5 | 0.9888 | 2.3808 | 0.0218 * | 0.2728 |
| 95 | 1 | 1.0219 | 2.1849 | 0.0549 | 0.0769 |
| 95 | 2 | 1.0133 | 2.1440 | 0.0463 * | 0.0360 * |
| 95 | 5 | 0.9690 | 2.0625 | 0.0020 * | −0.0455 * |
| 90 | 1 | 1.0040 | 1.9077 | 0.0370 * | −0.2003 |
| 90 | 2 | 0.9956 | 1.8609 | 0.0286 * | −0.2471 |
| 90 | 5 | 0.9514 | 1.7771 | −0.0156 * | −0.3309 |

Table 1 summarizes the impact of different values for $p_g$ and $p_c$ on the crop height estimate. The first row is the result of taking the two extreme points of each scan, highest and lowest, and using the difference as the crop height estimate. This produces unacceptable results, as the outdoor crop height estimate is 0.77 m larger than the actual crop height. This is the result of the tassels of the corn and tall corn leaves producing estimates of the plants' tops that are closest to the UAV. The ground estimate is also overestimated as it captures holes in the ground, and furrows in the field, producing long range scan estimates. The indoor data is similarly affected by noisy measurements, and overestimates the artificial plant heights. The height estimate is also unaffected by the imprecise manual control, which caused the UAV to repeatedly change its altitude over the field. Despite changing the UAV's position relative to the crop, the system was still able to form an accurate height estimate.

As more data is filtered from the scans, the crop height estimates converge to the actual values. For example, consider the values around $p_g$=0.95, which produced a stable flight from the UAV. Using this parameterization, rejecting a small amount of the close scans to the UAV, $p_c$=0.02, can produce a crop height estimate that is within 4 cm of the true value for the outdoor field. This parameterization also accurately estimates the indoor testbed's height.

Table 1 shows that the system, in this example, is more sensitive to changes in $p_g$ than to $p_c$ in the outdoor setting. This may be due to the dense upper canopy returns of many samples that are a good estimator for the top of the crop. On the other hand, very few samples reach the ground, so the few samples reaching the ground have a high probability of being corrupted by variations in the ground, holes, debris, or even small plants growing in the field.

Intuitively, the parameters match the physical aspects of the outdoor field. The top layers of leaves form a dense canopy, with only a few protrusions by leaves and corn tassels. Only a small number of measurements in each scan will reflect from these surfaces, which means $p_c$ can be very small. On the other hand, the ground readings are impacted by furrows in the field, and the generally uneven ground. This requires more noise rejection from the ground estimate, results in $p_g$=0.95. Given that the corn in the example outdoor testbed was in good health, and mature, the canopy in the field is representative of the highly cluttered environments the UAV can be configured to operate in.

In some examples, the system can be configured to use the laser scanner's ability to sense multiple levels of the crop canopy to generate multidimensional models of the field. These models can then be used to evaluate crop development and health. Additional sensors, such as a camera, can be added to the system to allow agronomy researchers a better view of a field's development and health. The system can be used on other crops to characterize the distribution of scan data for different plants. Different models can be used to adapt the existing hardware and software system to a larger variety of crops. Geo-referencing the combined data can be used in producing datamaps, which can be used to determine new insights into crop development and health.

In some examples, the system can be configured, by virtue of appropriate programming, for localizing the UAV over a row, so that the UAV can follow rows to autonomously survey phenotyping trials. Using an IMU and laser scanner, the system uses the repetitious nature of the rows to estimate the UAV's offset from a row. A row-following routine can improve the operation of UAVs in unstructured environments, and enables new types of environmental studies via UAVs.

In a typical corn phenotyping trial a test variety is planted in two rows, spaced 0.762 m apart, for short distances (<15 m). A field contains dozens or hundreds of these short trials to analyze varieties' responses to environmental conditions. The plants' response to environmental stimuli is analyzed using measurements from ground based vehicles and manual measurements. Collecting measurements this way is time consuming and destructive to the crops, which limits the number and frequency of measurements from the fields. The low spatio-temporal resolution data collection process makes it difficult to characterize the impact of short term environmental stresses at different periods of a plant's life.

The row localization operates in parallel with the height estimation procedure, and takes advantage of the same statistical distribution of range readings that are used in the height estimation procedure. The row localization exploits the repetitive nature of the rows of corn, the uniform spacing between the rows, and the density of the plant structure where the leaves meet the stalk.

The first step of the row localization process is the same as the height localization procedure. In this step, the laser scan data is projected from the laser frame of reference to the world frame. The 240° of data from the scanner is restricted to the 90° of data directly beneath the UAV. Assuming that the UAV flies at a maximum height of 4 m, limiting the scan data to this range eliminates readings that could not have reached the ground, and readings that oblique sunlight interferes with.

A percentile ranking for each range in the z axis is calculated. Using these percentile ranks, the barometric pressure reading, and a Kalman filter, the altitude of the UAV above the ground is estimated. One dimensional median filter banks with long and short time windows are used to eliminate outliers from the data as well.

Figure 6:
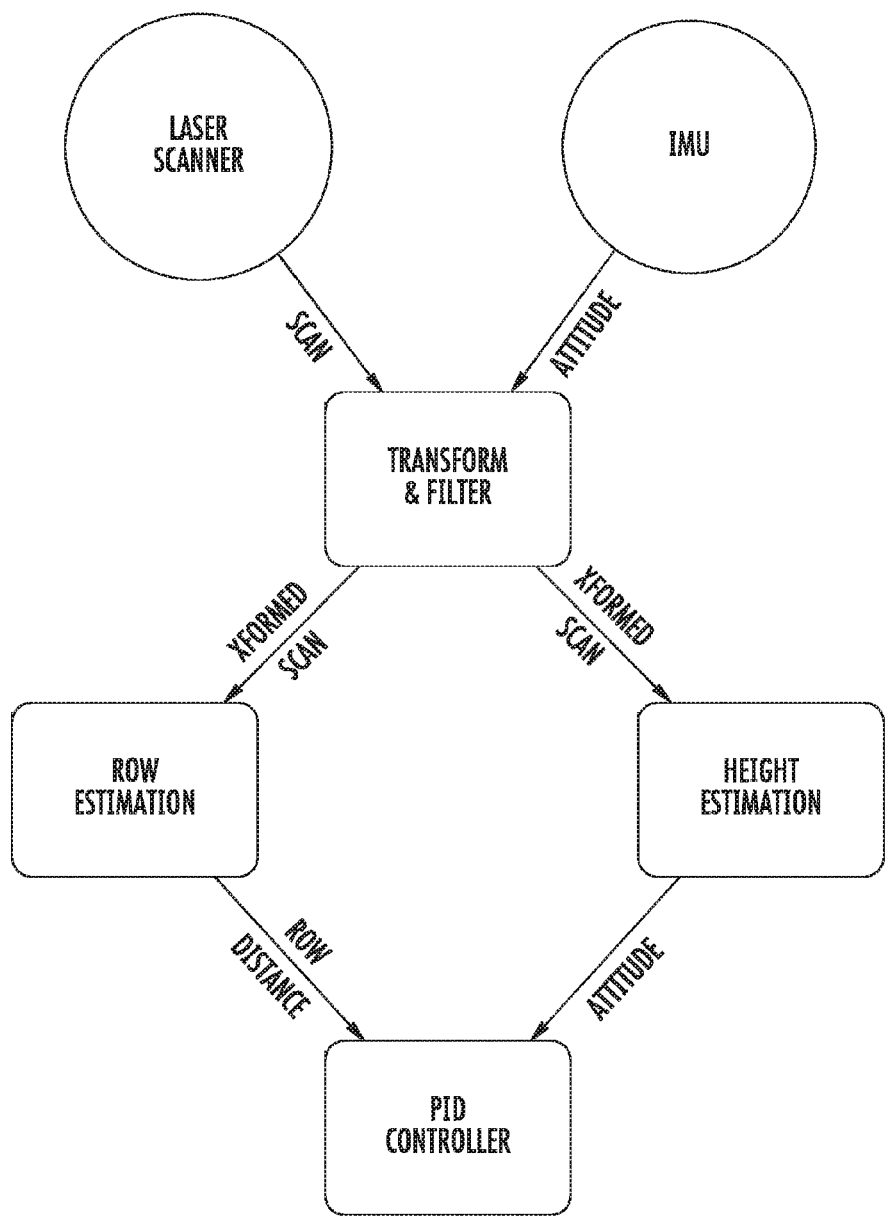
FIG. 6 depicts the row localization procedure.
Figure 7:
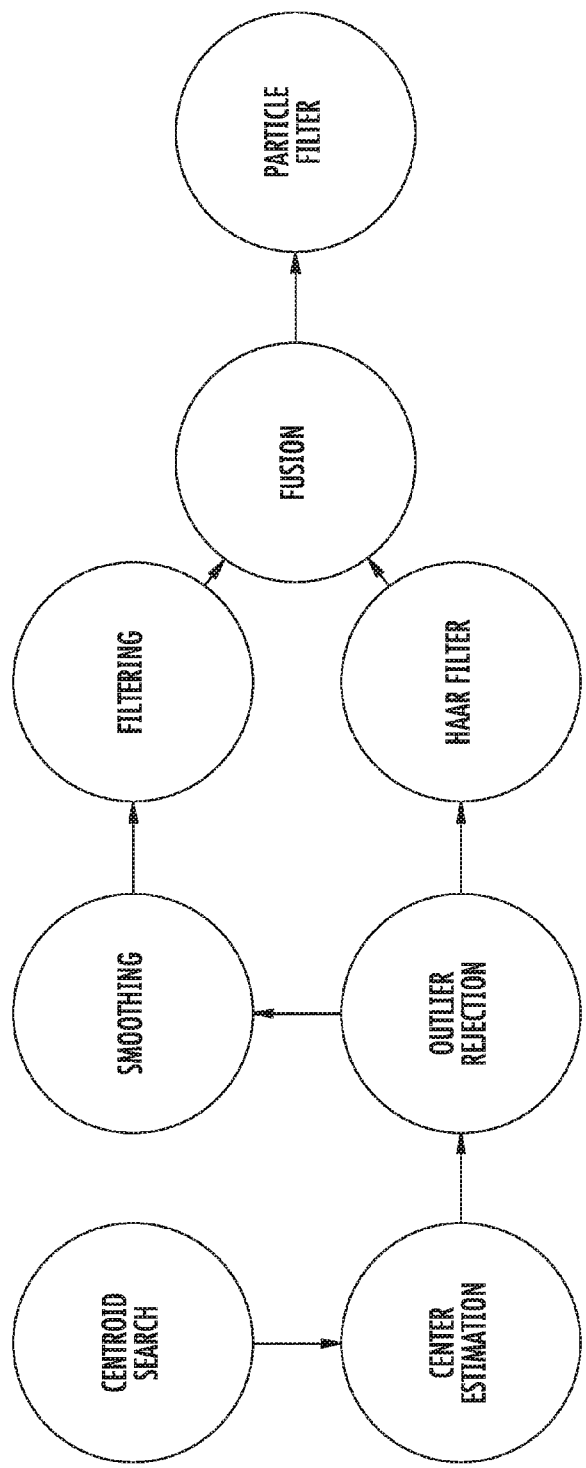
FIG. 7 illustrates the input data to the row localization procedure.

FIG. 6 depicts the row localization procedure. The procedure can filter the scan to find readings that indicate where the center of the row is, estimate the row center from these points, and the filter the estimate to reduce the noise in the estimate, and detect if the UAV has moved away from its target row. FIG. 7 illustrates the input data to the process, and the transformations it undergoes throughout the procedure.

Figure 8C:
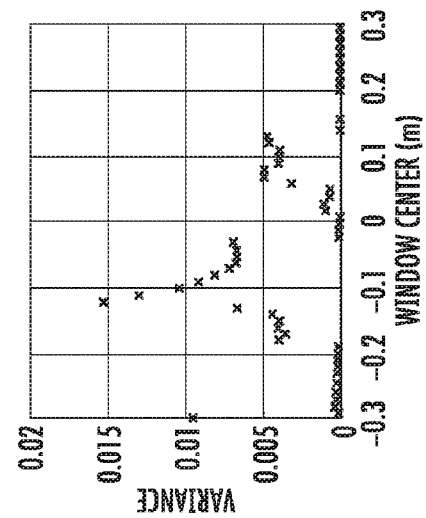
FIGS. 8A-C show an example scan from the laser scanner.
Figure 8B:
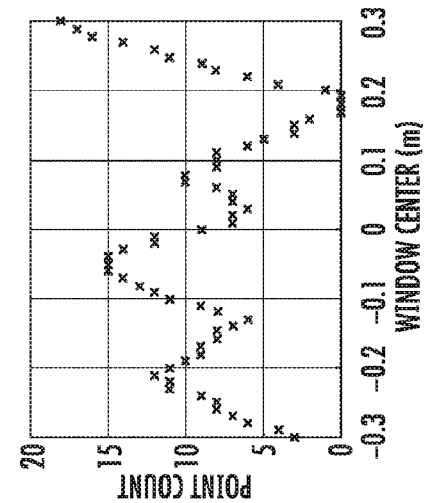
Figure 8A:
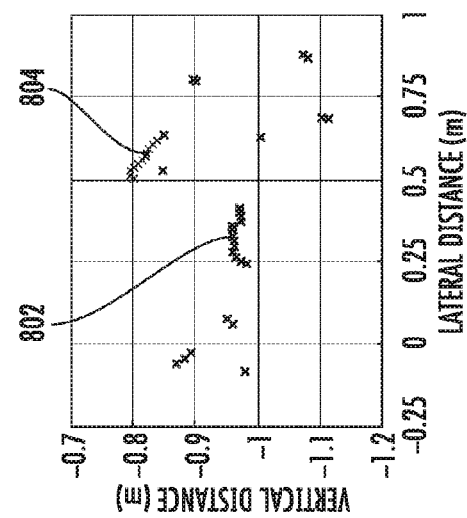

FIG. 8A shows an example scan from the laser scanner, after it has been projected into the UAV's reference frame. This figure highlights the difficulties in extracting features from the field. There are two sets of points 802 and 804 that indicate leaves. The true plant locations are close to −10 cm and 65 cm from the UAV. The leaves shadow many of the readings, and prevent them from reaching the small, central stalk. The stalk is often missed entirely when the UAV is not aligned with the plant.

The row localization process begins by finding a set of points that belong to the central portion of the plant. The scan in FIG. 8A gives an idea on how to do this. The central portion of the plant that corresponds to a row is denser, as this is where the stalk is, and the leaves join together. This means the density of points along the x-axis acts as an indicator for where the center of the row is. The repetitious nature of the rows can also be exploited, as the points should be denser at intervals corresponding to multiples of the row widths.

FIG. 8B shows the number of points in a 10 cm windows that are repeated at intervals of the row width. These windows are 'slid' across the scan, and the number of points that fall within the windows are counted. The density of the scan readings in the x axis increases when the windows align with the true position of the rows because of the increased density of the plants near their center.

This filtering process produces strong responses about the true row location at −0.1 m, but also a false response around 0.3 m that is caused by the laser scan plane intersecting the leaves. A second feature can be used to further refine the estimate. This second feature is based on the intuition that a flat leaf will have a strong shadowing effect, which will limit how many laser readings penetrate the canopy in the z axis.

On the other hand, sharply angled leaves that are near the stalk, and the stalk itself, will have many readings in the z axis. Therefore, the variance of the readings in the sliding window is calculated in the z axis. A high variance indicates that many readings were scattered throughout the z axis, which indicates the scans are coming from along the center portion of the stalk. The set of points which are both dense in the x axis, and highly variable in the z axis are used to estimate the positions of the rows.

Once a good candidate set of points is selected, they are passed to the next step in the row estimation, which is the center estimation step. The median of the candidate points is calculated, and this is the estimate of the center of the row. This estimate is then filtered with a one dimensional median filter to reject outliers in the data.

The control system of the UAV can use the row center estimate to control the UAV's position relative to a single row in a field. However, the estimate is noisy, which causes the UAV to occasionally move closer to the adjacent rows. This is exacerbated in outdoor conditions, where wind gusts and other disturbances can push the UAV off of a row. The combination of disturbances and state estimate noise inevitably cause the UAV to drift off of the target row, where it begins tracking and localizing itself relative to an adjacent row. This problem may be especially pronounced when the UAV approaches the midpoint of two rows, where it has difficulty determining whether it is to the left or right of its target row, because it will receive strong feature estimates from both rows.

Two mechanisms are used to reduce the estimate noise. The first is a smoothing operation. The sensing operation creates uncertainty as to which row the UAV is localizing itself to, as gaps in the plants, plant damage, or measurement noise may cause the UAV to begin tracking a row adjacent to the one which it is flying over. As a result of this uncertainty, there is ambiguity in each position estimate as to whether it is relative to the current row, or one of the rows adjacent to the UAV. This ambiguity is extremely problematic, as the UAV may believe it is moving to the extreme left or right of row, especially if it is close to the midpoint of two rows.

To resolve this ambiguity, the position estimate, d, is used to derive three possible potential positions relative to the current row, and relative to each adjacent row. The system chooses between these three possible positions by using the estimate that is the shortest distance from the prior position estimate. The high laser sensing rate makes it unlikely that the UAV has moved a large distance in between position estimates, so using the distance estimate that is closest to the prior estimate creates a smooth input to the underlying movement controller.

The smoothing operation works in short time windows to reduce the impact of noise on the system, but tends to diverge when the UAV operates near the midpoints of two rows. Any measurement error can cause the smoothing operation to miss when the UAV moves away from the target row, or miss a transition. Therefore, a second, slower filter, uses a Haar wavelet to detect discontinuities in the unsmoothed row distance estimate, which indicate the UAV has moved closer to an adjacent row, than the row it is currently over. These discontinuities are a more accurate indicator of when the UAV has moved to an adjacent row, and in the future we will combine the smoothed estimate with the output of the slow filter to produce a smooth position estimate that is stable over long time windows.

The short term, smoothed distance estimate, and the long term row offset generated by the Haar filter are then combined to form a final estimate of the UAV's position. A particle filter uses this estimate to create a final estimate of the UAV's position. A PID controller can use the output of the particle filter and the height estimation process to generate roll, pitch, yaw, and thrust commands for the UAV.

An alternative row following procedure may perform better in some field conditions. The alternative procedure is similar to the prior procedure, but offers improved performance in some conditions.

Figure 10:
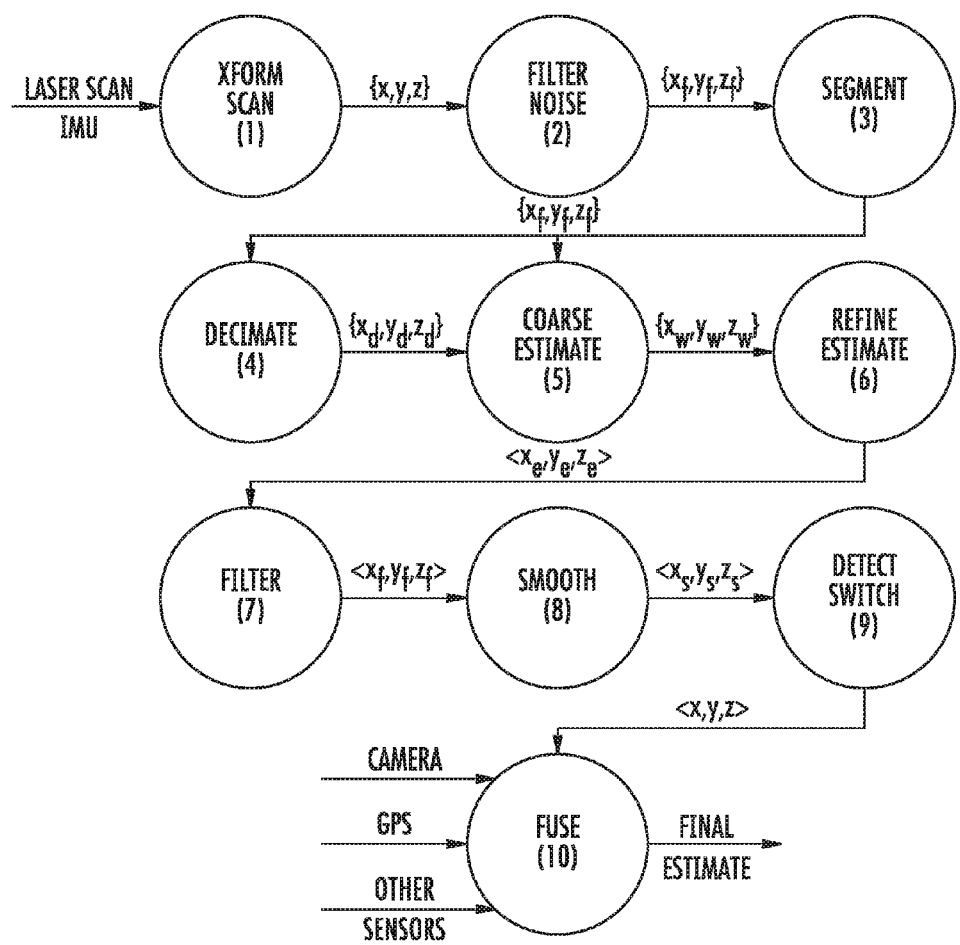
FIG. 10 shows an alternative row localization procedure.

There are three elements to the row localization procedure. The steps are: feature extraction, estimate filtering, and sensor fusion. The procedure produces a one degree of freedom estimate of the UAV's pose relative to the corn row it is tracking. Combined with the height estimation procedure, the combination of laser scanner and IMU creates a two degree of freedom pose of the UAV's position in the cornfield. FIG. 10 shows the complete process.

1) Feature Extraction:

The first step of the row localization procedure is estimating the position of the row from the laser scanner data. This localization procedure works on the principle that due to the repetitious nature of the corn rows and the plant matter being denser closer to the stalks, that there should be dense clusters of laser scan readings periodically repeated at the width of the corn row spacing.

Laser scan projection: The laser scan data is transformed from a frame of reference relative to the laser scanner to the UAV's reference frame. Each range reading from the laser scanner is decomposed into (x, y, z) components that are relative to the UAV's physical center. This is the first state in FIG. 10.

Figure 11:
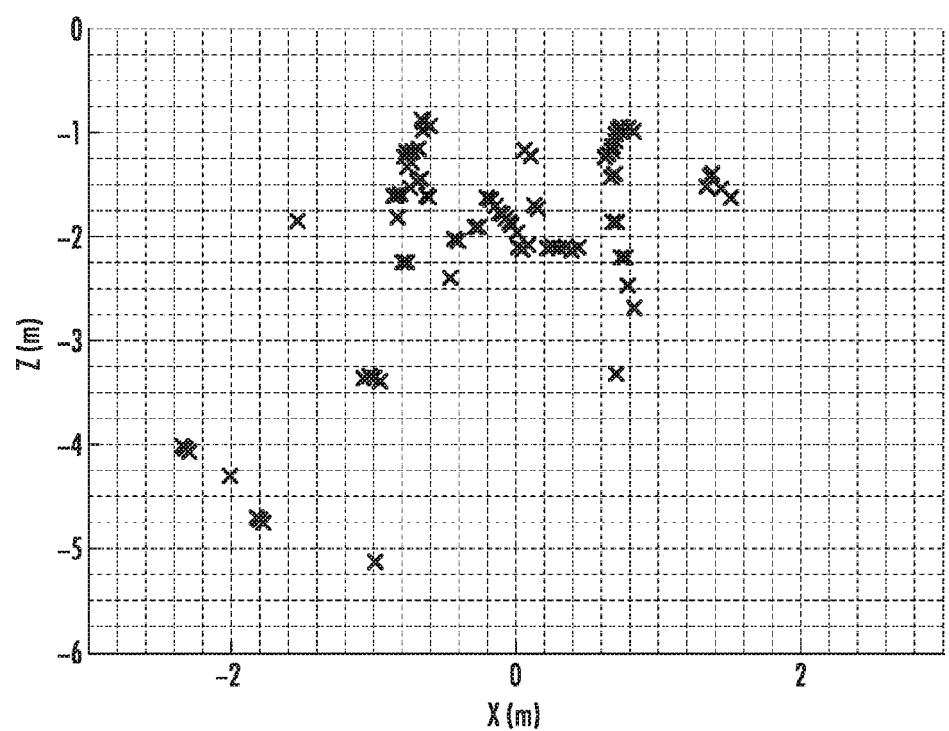
FIG. 11 depicts an example scan from the laser scanner.

FIG. 11 shows an example scan from a cornfield that has been projected into the UAV's coordinate frame. The UAV is nearly centered over a row of corn, which creates a large number of points that are spread out under the UAV. At approximate x=±0.75 m, the adjacent rows appear as lines of vertically staggered points. A leaf two meters below the UAV extends between the row underneath the UAV in the positive x direction.

Noise rejection: Using the same statistical procedure as the height estimation, the range readings are filtered to eliminate those that lie above the crop canopy or below the ground level. The remaining points are assumed to be from the plants in the field. The unfiltered range readings $\{x, y, z\}$ enter the second node in FIG. 10, and the filtered estimates, $\{x_f, y_f, z_f\}$ are sent to the next state in the process.

Segmentation: Next, the scan readings are segmented according to their x-axis value. This segmentation takes advantage of the repetitious nature of the corn rows. If the corn rows are spaced $r_w$ meters apart, then n windows are created, each with width $$\left[\frac{-r_w}{n}, \frac{r_w}{n}\right]$$

These n windows are created so that the first two windows share a border directly below the UAV. The remaining n−2 windows are sequentially placed to each side of the existing windows. In addition, n−1 windows are created, but the first of these windows is centered beneath the UAV, so that it bisects the original n windows. These windows extend from the center of the UAV, to a distance of $$\frac{r_w}{n}.$$

from the UAV.

This pattern of 2n−1 windows are repeated at intervals of $r_w$. If the UAV is directly over a target row of corn, these sets of windows will be aligned on the adjacent rows of corn. These windows define regions where the system will search for the center of corn plants. Naively, we could search these windows to find which ones had the most points in them, and assume those windows contained the centers of the rows, but this is an error prone method. When the laser scanner is collinearly arranged with a corn leaf, a large number of points can be generated in one window that does not correspond to the plant center. Also, we wish to find points that are scattered throughout the z-axis, as this is an indicator that scanner is sensing the central stalk of a plant. Therefore, we further refine our segmented scans.

Figure 12:
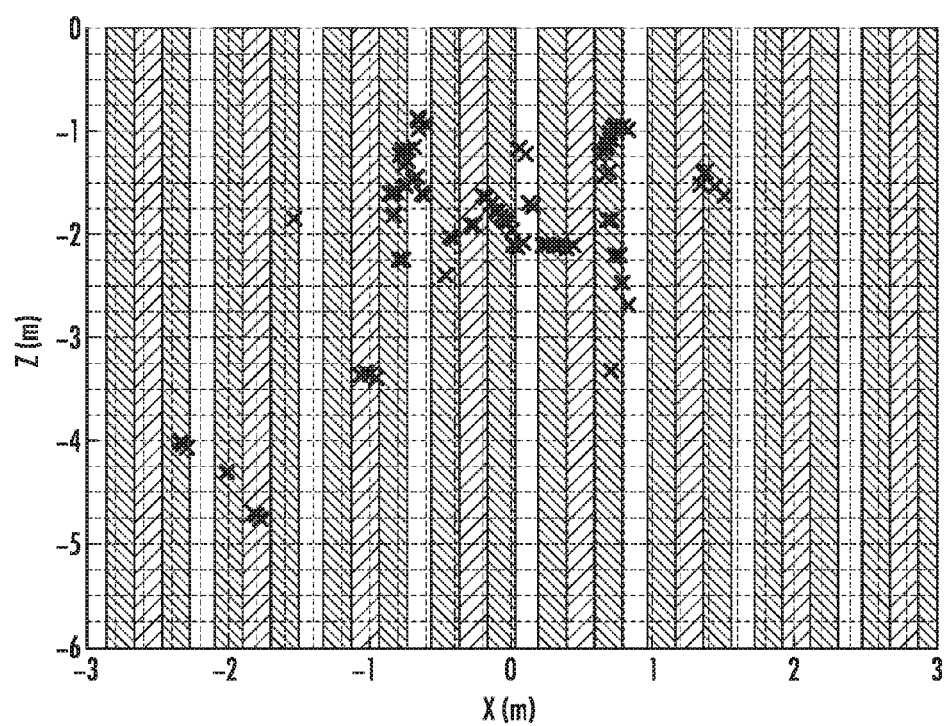
FIGS. 12-13 illustrate the segmentation process of the alternative row location procedure.
Figure 13:
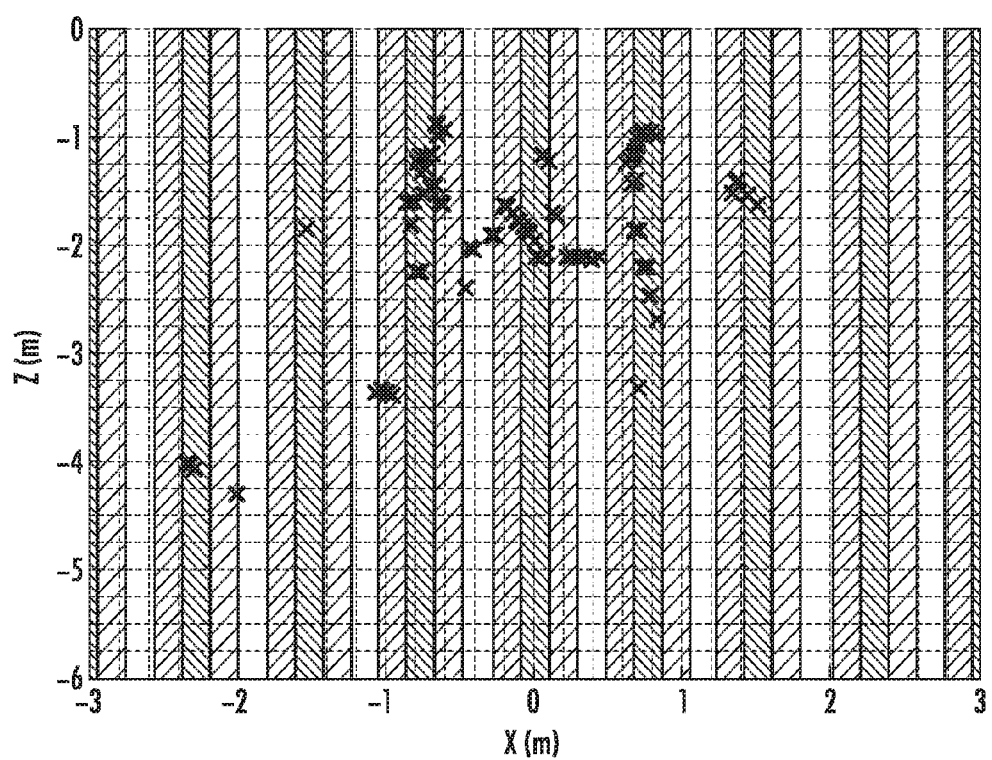

FIGS. 12 and 13 illustrate the segmentation process. FIG. 12 depicts the first sets of n windows, which are repeated at intervals of the row width. The colors correspond to windows that are offset at multiple of the row width. FIG. 13 shows the second sets of n−1 windows, which are offset from the first set.

In FIG. 10, the same set of filtered range readings enter and leave the third node, however, they are annotated with which windows they belong to.

Decimation: Inside each window, the readings are decimated using their x and z components. First, the each window is divided into regions of height $h_z$ in the z-axis. All but one point at each level is eliminated. After this decimation, the number of points at each level in the windows spaced $r_w$ distance apart are counted. The windows with the most points are assumed to contain the centers of the corn plants.

This decimation eliminates two problems with locating the center of the plants. The first is when leaves are collinear with the laser scan plane. This produces an extremely dense cluster of points that may look like the center of the plant. The second problem is when the laser scanner encounters a broken or extremely bent leaf. This can produce a large number of tightly clustered points in the z-axis that do not correspond to the corn stalks. By performing a decimation, and then counting the remaining points, an accurate predictor of the windows which contain the corn stalks is obtained.

This process helps remove leaves, such as the one shown in FIG. 2, by only allowing one point from the leaf to count when trying to determine where the corn stalks are. In contrast, the points in the adjacent rows that are spread throughout the z-axis all count when determining which window contains the corn stalks.

This procedure also motivates the use of the additional n−1 windows that are centered on the boundaries of the initial n windows. If the UAV is flying extremely close to the center of a row, the original n windows will lie on the boundaries of the corn stalks, and the decimation procedure will split the points between the adjacent windows, which produces an artificially low point count where the corn actually is.

Figure 14:
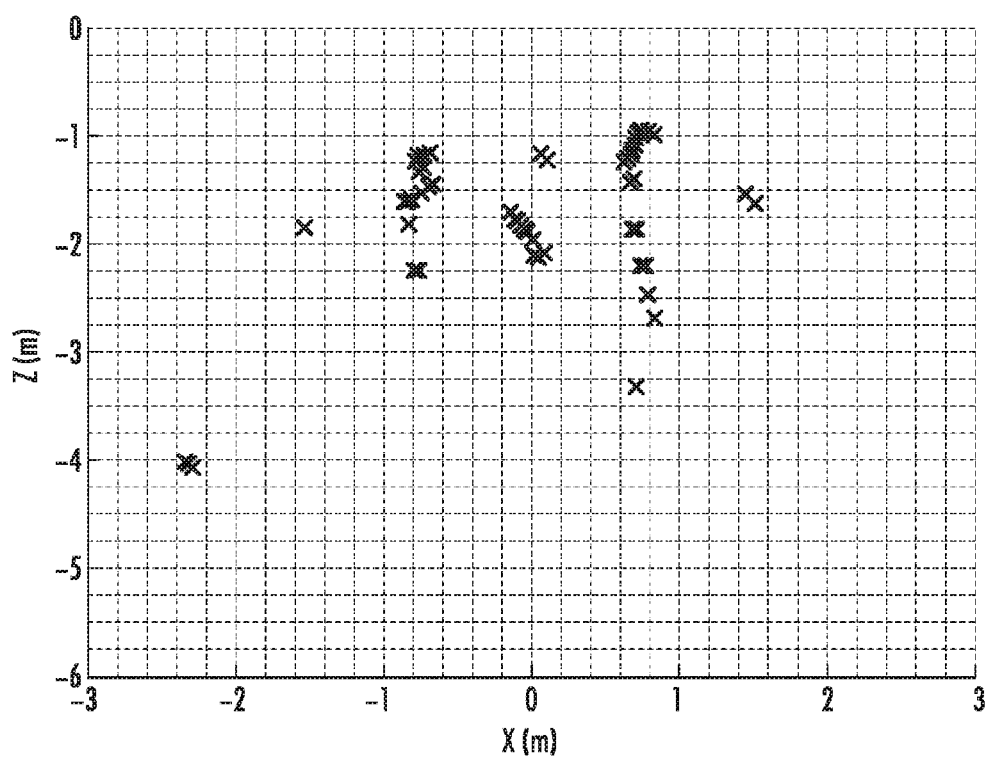
FIG. 14 shows the filtered scan used for the alternative row localization procedure.

FIG. 14 shows the set of points that are used to estimate where the center of the row is. The segmentation and decimation procedures have eliminated points that belong to the leaves, leaving only the points that belong to the corn stalks. By identifying which sets of windows contain the corn stalks, the system is able to produce a coarse estimate of the corn stalks' positions. The full set of points from these windows is used to further refine the position estimate.

Figure 15:
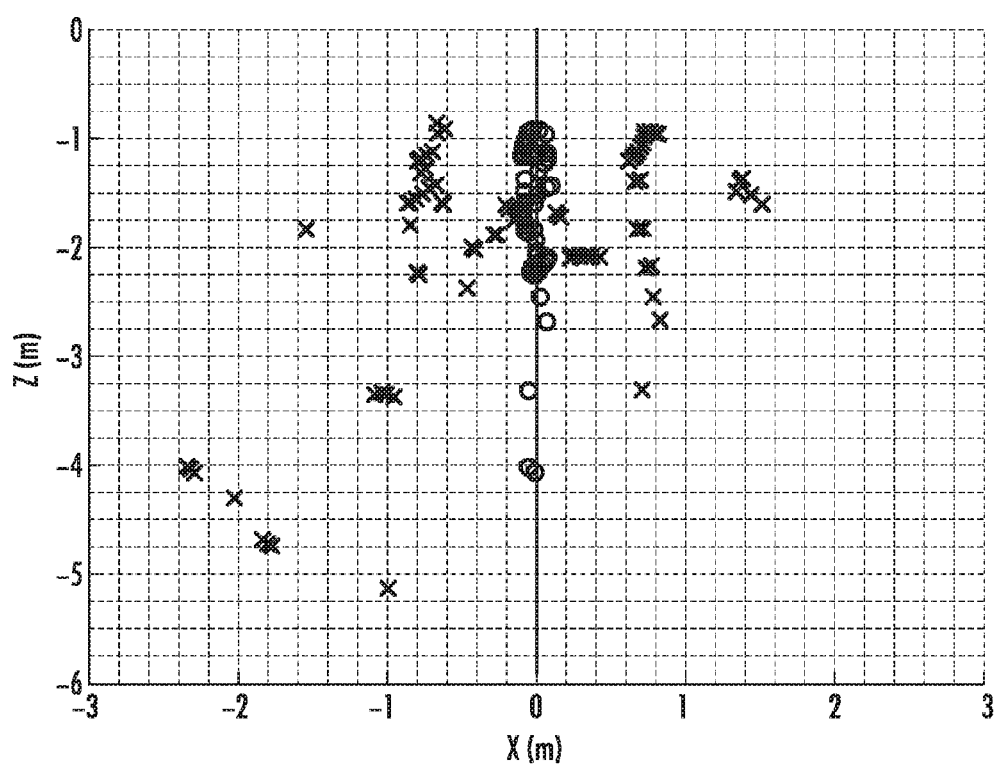
FIG. 15 illustrates the estimated location of the UAV, overlaid on the previous stages of the row localization procedure.

Merging: The points from the windows containing the center of the rows are then shifted, so that they appear to be aligned together in one window. FIG. 15 shows the merged points as circles, with the original readings in FIG. 14 shown as X's.

Estimation: The center of the corn plants is estimated by taking the median of the merged points in the x-axis. This further refines the estimate within the window. The UAV's position estimate is shown as a vertical line in FIG. 15. In FIG. 10, nodes 4, 5, and 6 represent the decimation process, identifying which windows contain the corn stalks, and the refined estimate of the corn stalks' positions within the windows.

2) Filtering:

The raw sensor estimates are then passed through a series of filters. The first filter is a non-linear, one dimensional median filter which mitigates outliers in the estimate. A finite impulse response (FIR) filter is then used to further reduce noise in the system.

This filter estimate is typically accurate when the UAV is near the center of the corn, but experiences problems when the UAV is near the midpoint of two rows. In this case, the estimates rapidly oscillate between $$\frac{-r_w}{n} \text{ and } \frac{r_w}{n}.$$

as the UAV switches between tracking the rows to either side of it. The system eliminates these oscillations by comparing its new estimated position, $x_t$ to its previous estimate, $x_{t-1}$. $x_t$ is then shifted one row to the left and right of the UAV, and the distance between these shifted estimates and the prior estimate is also calculated. The estimate with the minimum distance to the prior estimate is assumed to be correct, as this corresponds to the estimate which required the UAV to travel the least distance between scan readings. The high scan rate of the laser means the vehicle dynamics are not significant when compared to the estimation process when the UAV is near the center of the rows.

This process may not eliminate all cases where the UAV mistakenly begins tracking an adjacent row. In these cases, the sensor estimate appears to have a discontinuity, where the sensor readings quickly shift from extremely positive to extremely negative, or vice-versa. Either a moving average filter or Haar filter with a large window can detect these discontinuities, and further refine the estimate.

Nodes 7, 8, and 9 represent this filtering, smoothing, and row switch detection operation in FIG. 10.

3) Fusion:

The final step is optional. If the system has a GPS, optical flow camera, or some other means of estimating its position, the pose estimate from the laser scanner is fused in a particle filter with the other position estimates. This fused position estimate us used by the onboard control system to guide the UAV back to the center of the row. Node 10 in FIG. 10 shows the fusion process using a camera, GPS, and other sensors.

The system can be tested in indoor and outdoor settings. The following discussion illustrates example test results for one possible example of testing the system.

Figure 9A:
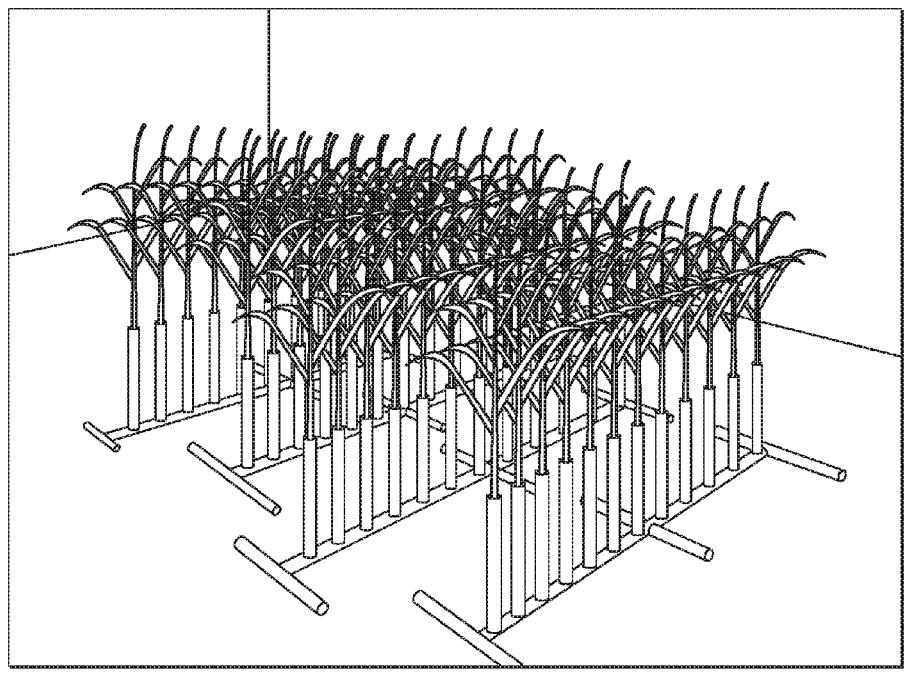
FIGS. 9A-C show the indoor test environment.

FIG. 9A shows the indoor test environment. FIG. 9B shows the results of the indoor test runs. The smoothed estimate of the UAV's position is still relatively noisy, which necessitates the longer term smoothing operation. The combination of these two operations enables smooth, controlled flight of the UAV. Even though the UAV occasionally moves over an adjacent row, it quickly resumes tracking the original row.

The row tracking operation requires the UAV to maintain a slow lateral speed. If the UAV moves too quickly between one row to the next, the UAV is unable to detect the row change.

Figure 9C:
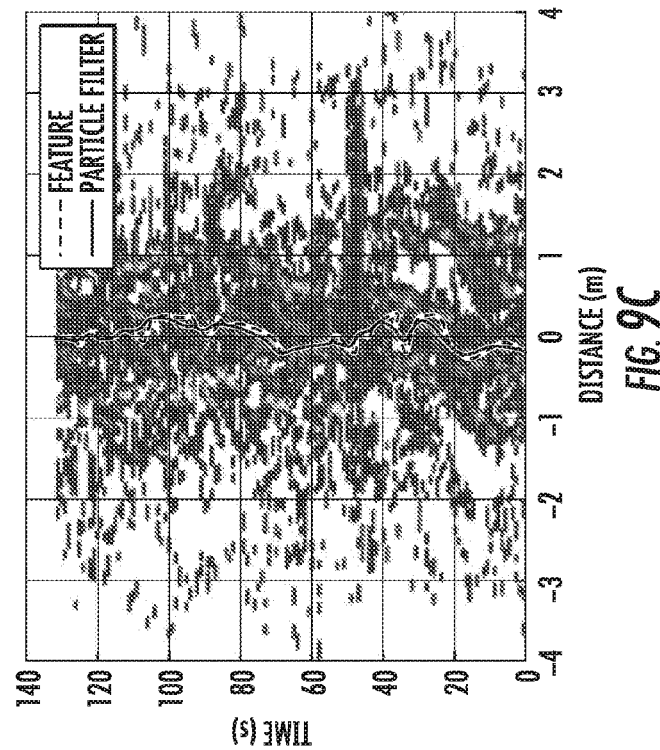
Figure 9B:
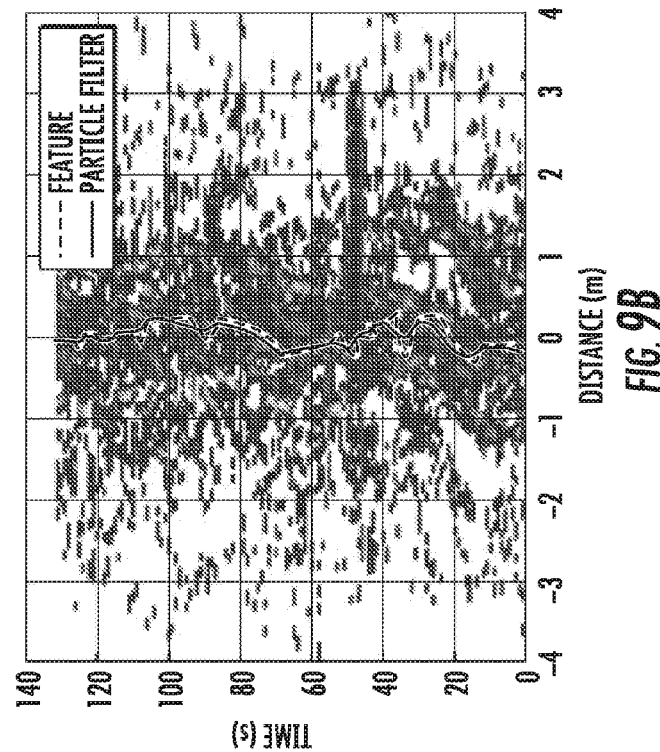

FIG. 9C shows the density of laser scan data from flight conducted by manually flying over a mature corn field. The position estimated by the feature extraction and particle filter are overlaid on the map. The density of the laser scans in the x axis is shown underneath the flight path. The density of the laser scans shows clear peaks that are spaced about 1.5 m apart. These peaks correspond to the adjacent rows to the UAV, which shows there are clear features the UAV is able to track. Interestingly, the row directly underneath the UAV is less distinguishable. This is attributed to the prop wash from the UAV blowing the leaves down, and the leaves obscuring many of the laser scans at a high level, because of the direct sensing angle. On the other hand, the adjacent rows are not blown down as much, and the oblique angle of the laser allows more laser scans to penetrate through to the stalk.

Figure 16:
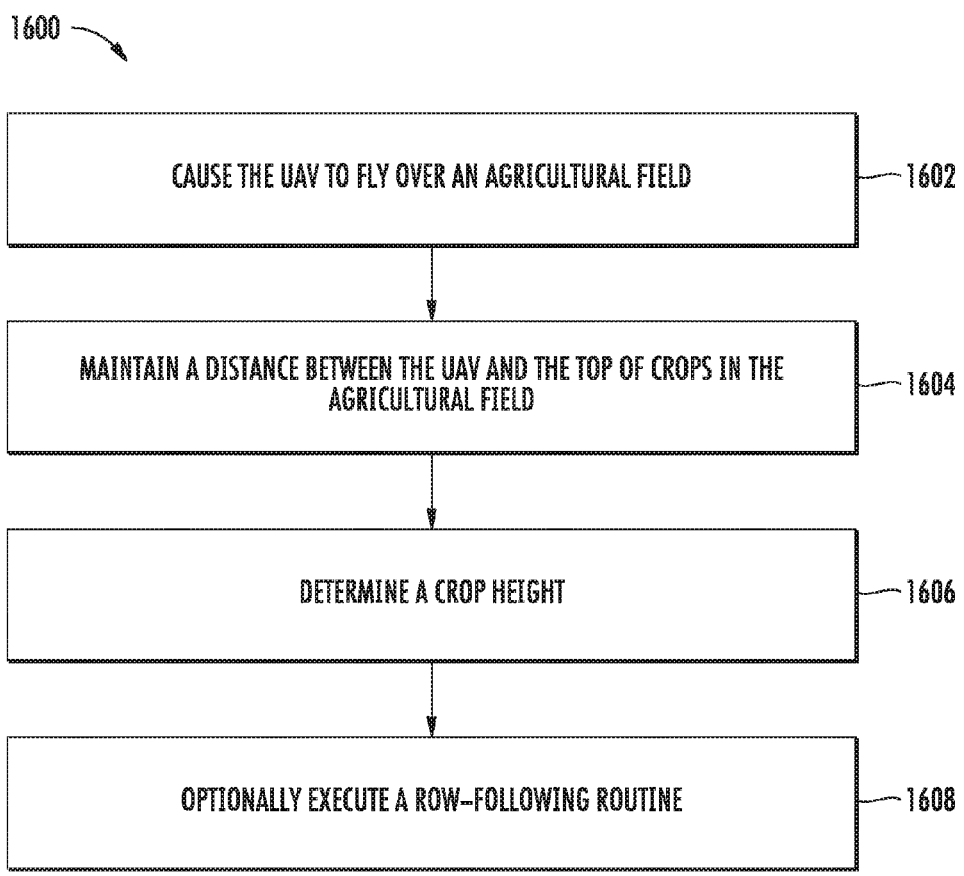
FIG. 16 is a flow diagram of an example method 1600 performed by a control system of a UAV.

FIG. 16 is a flow diagram of an example method 1600 performed by a control system of a UAV. The control system can be any appropriate system of one or more computing devices. For example, the control system can be a microcontroller configured, by virtue of appropriate programming, to perform the method 1600.

The control system causes, using an aerial propulsion system of the UAV, the UAV to fly over an agricultural field (1602).

The control system maintains, using the using the aerial propulsion system and a laser scanner, a distance between the UAV and a top of crops in the agricultural field to within a programmed range of distances based on the maximum range of the laser scanner (1604). The laser scanner is configured to face downwards while the UAV is in flight. The laser scanner is configured to scan through a two-dimensional scan angle and is characterized by a maximum range.

In some examples, the control system decimates the range data using a cone filter for removing one or more outliers in the range data using a median filter. Maintaining the distance between the UAV and the top of crops in the agricultural field to within the programmed range of distances can include combining a height estimate based on the range data with a barometric pressure height estimate determined using a pressure sensor of the UAV. Maintaining the distance between the UAV and the top of crops in the agricultural field to within the programmed range of distances can include applying a Kalman filter to a result of combining the height estimate based on the range data with the barometric pressure height estimate. Maintaining the distance between the UAV and the top of crops in the agricultural field to within the programmed range of distances can include executing a proportional-integral-derivative (PID) controller routine using a resulting height estimate of the Kalman filter.

The control system determines, using range data from the laser scanner, a crop height from the top of the crops to the ground (1606). Determining the crop height can include transforming the range data from a body frame of the UAV to a world frame using roll, pitch, and yaw data from an inertial measurement unit (IMU) of the UAV to extract a plurality of z-components of the range data in the world frame. Determining the crop height can include computing a percentile rank for each z-component and using the percentile ranks and the z-components to determine an estimate of the distance between the UAV and the top of the crops and an estimate of the crop height. Determining the estimate of the distance between the UAV and the top of the craps and the crop height can include searching the percentile ranks to find the closest percentiles to existing estimates of the distance between the UAV and the top of the crops and the crop height. The control system can georeferenced the crop height and/or the range data using a global positioning system (GPS) receiver of the UAV.

In some examples, the control system executes a row-following routine to guide the UAV along one or more rows of crops in the agricultural field (1608). Executing the row-following routine can include determining a lateral distance to the row of crops using the range data from the laser scanner and using the lateral distance to determine a row center estimate to control the position of the UAV relative to the row of crops.

Various combinations and sub-combinations of the structures and features described in this specification are contemplated and will be apparent to a skilled person having knowledge of this disclosure. Any of the various features and elements as disclosed in this specification may be combined with one or more other disclosed features and elements unless indicated to the contrary.

Correspondingly, the subject matter as claimed is intended to be broadly construed and interpreted, as including all such variations, modifications and alternative embodiments, within its scope and including equivalents of the claims. It is understood that various details of the presently disclosed subject matter may be changed without departing from the scope of the claims. Furthermore, the foregoing description is for the purpose of illustration only, and not for the purpose of limitation.

What is claimed is:

1. An unmanned aerial vehicle (UAV) comprising:
   an aerial propulsion system;
   a laser scanner configured to face downwards while the UAV is in flight, wherein the laser scanner is configured to scan through a two-dimensional scan angle and is characterized by a maximum range;
   a control system configured to perform operations comprising:
      causing, using the aerial propulsion system, the UAV to fly over an agricultural field;
      maintaining, using the aerial propulsion system and the laser scanner, a distance between the UAV and a top of crops in the agricultural field to within a programmed range of distances based on the maximum range of the laser scanner; and
      determining, using range data from the laser scanner, a crop height from the top of the crops to the ground; and
   an inertial measurement unit (IMU), wherein determining the crop height comprises transforming the range data from a body frame of the UAV to a world frame using roll, pitch, and yaw data from the IMU to extract a plurality of z-components of the range data in the world frame.

2. The UAV of claim 1, wherein determining the crop height comprises computing a percentile rank for each z-component and using the percentile ranks and the z-components to determine an estimate of the distance between the UAV and the top of the crops and an estimate of the crop height.

3. The UAV of claim 2, wherein determining the estimate of the distance between the UAV and the top of the craps and the crop height comprises searching the percentile ranks to find the closest percentiles to existing estimates of the distance between the UAV and the top of the crops and the crop height.

4. An unmanned aerial vehicle (UAV) comprising:
   an aerial propulsion system;
   a laser scanner configured to face downwards while the UAV is in flight, wherein the laser scanner is configured to scan through a two-dimensional scan angle and is characterized by a maximum range; and
   a control system configured to perform operations comprising:
      causing, using the aerial propulsion system, the UAV to fly over an agricultural field;
      maintaining, using the aerial propulsion system and the laser scanner, a distance between the UAV and a top of crops in the agricultural field to within a programmed range of distances based on the maximum range of the laser scanner; and
      determining, using range data from the laser scanner, a crop height from the top of the crops to the ground;
   wherein the control system comprises a cone filter for decimating the range data and a median filter for removing one or more outliers in the range data.

5. The UAV of claim 1, comprising a pressure sensor, wherein maintaining the distance between the UAV and the top of crops in the agricultural field to within the programmed range of distances comprises combining a height estimate based on the range data with a barometric pressure height estimate determined using the pressure sensor.

6. An unmanned aerial vehicle (UAV) comprising:
   an aerial propulsion system;
   a laser scanner configured to face downwards while the UAV is in flight, wherein the laser scanner is configured to scan through a two-dimensional scan angle and is characterized by a maximum range;
   a control system configured to perform operations comprising:
      causing, using the aerial propulsion system, the UAV to fly over an agricultural field;
      maintaining, using the aerial propulsion system and the laser scanner, a distance between the UAV and a top of crops in the agricultural field to within a programmed range of distances based on the maximum range of the laser scanner; and
      determining, using range data from the laser scanner, a crop height from the top of the crops to the ground; and
   a pressure sensor, wherein maintaining the distance between the UAV and the top of crops in the agricultural field to within the programmed range of distances comprises combining a height estimate based on the range data with a barometric pressure height estimate determined using the pressure sensor;
   wherein maintaining the distance between the UAV and the top of crops in the agricultural field to within the programmed range of distances comprises applying a Kalman filter to a result of combining the height estimate based on the range data with the barometric pressure height estimate, and wherein maintaining the distance between the UAV and the top of crops in the agricultural field to within the programmed range of distances comprises executing a proportional-integral-derivative (PID) controller routine using a resulting height estimate of the Kalman filter.

7. The UAV of claim 1, comprising a global positioning system (GPS) receiver, wherein the operations comprise georeferencing the crop height and/or the range data using the GPS receiver.

8. The UAV of claim 1, wherein the operations comprise executing a row-following routine and causing the UAV to autonomously follow a row of crops using the range data from the laser scanner.

9. An unmanned aerial vehicle (UAV) comprising:
an aerial propulsion system;
a laser scanner configured to face downwards while the UAV is in flight, wherein the laser scanner is configured to scan through a two-dimensional scan angle and is characterized by a maximum range; and
a control system configured to perform operations comprising:
causing, using the aerial propulsion system, the UAV to fly over an agricultural field;
maintaining, using the aerial propulsion system and the laser scanner, a distance between the UAV and a top of crops in the agricultural field to within a programmed range of distances based on the maximum range of the laser scanner; and
determining, using range data from the laser scanner, a crop height from the top of the crops to the ground;
wherein the operations comprise executing a row-following routine and causing the UAV to autonomously follow a row of crops using the range data from the laser scanner;
wherein executing the row-following routine comprises determining a lateral distance to the row of crops using the range data from the laser scanner and using the lateral distance to determine a row center estimate to control the position of the UAV relative to the row of crops.

10. The UAV of claim 8, wherein executing the row-following routine comprises using one or more periodic window filters to coarsely estimate one or more positions of crop stalks relative to the UAV.

11. The UAV of claim 8, wherein executing the row-following routine comprises determining one or more positions of crop stalks using vertical and lateral spacing data of transformed range data to remove one or more spurious features from the transformed range data.

12. A method performed by a control system of an unmanned aerial vehicle (UAV), the method comprising:
causing, using an aerial propulsion system of the UAV, the UAV to fly over an agricultural field;
maintaining, using the aerial propulsion system and a laser scanner, a distance between the UAV and a top of crops in the agricultural field to within a programmed range of distances based on the maximum range of the laser scanner, wherein the laser scanner is configured to face downwards while the UAV is in flight, and wherein the laser scanner is configured to scan through a two-dimensional scan angle and is characterized by a maximum range; and
determining, using range data from the laser scanner, a crop height from the top of the crops to the ground;
wherein determining the crop height comprises transforming the range data from a body frame of the UAV to a world frame using roll, pitch, and yaw data from an inertial measurement unit (IMU) of the UAV to extract a plurality of z-components of the range data in the world frame.

13. The method of claim 12, wherein determining the crop height comprises computing a percentile rank for each z-component and using the percentile ranks and the z-components to determine an estimate of the distance between the UAV and the top of the crops and an estimate of the crop height.

14. The method of claim 13, wherein determining the estimate of the distance between the UAV and the top of the craps and the crop height comprises searching the percentile ranks to find the closest percentiles to existing estimates of the distance between the UAV and the top of the crops and the crop height.

15. The method of claim 12, comprising decimating the range data using a cone filter for removing one or more outliers in the range data using a median filter.

16. The method of claim 12, wherein maintaining the distance between the UAV and the top of crops in the agricultural field to within the programmed range of distances comprises combining a height estimate based on the range data with a barometric pressure height estimate determined using a pressure sensor of the UAV.

17. A method performed by a control system of an unmanned aerial vehicle (UAV), the method comprising:
causing, using an aerial propulsion system of the UAV, the UAV to fly over an agricultural field;
maintaining, using the aerial propulsion system and a laser scanner, a distance between the UAV and a top of crops in the agricultural field to within a programmed range of distances based on the maximum range of the laser scanner, wherein the laser scanner is configured to face downwards while the UAV is in flight, and wherein the laser scanner is configured to scan through a two-dimensional scan angle and is characterized by a maximum range; and
determining, using range data from the laser scanner, a crop height from the top of the crops to the ground;
wherein maintaining the distance between the UAV and the top of crops in the agricultural field to within the programmed range of distances comprises combining a height estimate based on the range data with a barometric pressure height estimate determined using a pressure sensor of the UAV; and
wherein maintaining the distance between the UAV and the top of crops in the agricultural field to within the programmed range of distances comprises applying a Kalman filter to a result of combining the height estimate based on the range data with the barometric pressure height estimate, and wherein maintaining the distance between the UAV and the top of crops in the agricultural field to within the programmed range of distances comprises executing a proportional-integral-derivative (PID) controller routine using a resulting height estimate of the Kalman filter.

18. The method of claim 12, comprising georeferencing the crop height and/or the range data using a global positioning system (GPS) receiver of the UAV.

19. The method of claim 12, comprising executing a row-following routine and causing the UAV to autonomously follow a row of crops using the range data from the laser scanner.

20. A method performed by a control system of an unmanned aerial vehicle (UAV), the method comprising:
causing, using an aerial propulsion system of the UAV, the UAV to fly over an agricultural field;
maintaining, using the aerial propulsion system and a laser scanner, a distance between the UAV and a top of crops in the agricultural field to within a programmed range of distances based on the maximum range of the laser scanner, wherein the laser scanner is configured to face downwards while the UAV is in flight, and wherein the laser scanner is configured to scan through a two-dimensional scan angle and is characterized by a maximum range;

determining, using range data from the laser scanner, a crop height from the top of the crops to the ground; and executing a row-following routine and causing the UAV to autonomously follow a row of crops using the range data from the laser scanner;

wherein executing the row-following routine comprises determining a lateral distance to the row of crops using the range data from the laser scanner and using the lateral distance to determine a row center estimate to control the position of the UAV relative to the row of crops.

21. The method of claim 19, wherein executing the row-following routine comprises using one or more periodic window filters to coarsely estimate one or more positions of crop stalks relative to the UAV.

22. The method of claim 19, wherein executing the row-following routine comprises determining one or more positions of crop stalks using vertical and lateral spacing data of transformed range data to remove one or more spurious features from the transformed range data.

* * * * *